(12) United States Patent
Takizawa et al.

(10) Patent No.: US 7,450,299 B2
(45) Date of Patent: Nov. 11, 2008

(54) BROADBAND TELESCOPE

(75) Inventors: Yoshiyuki Takizawa, Wako (JP);
Yoshiyuki Takahashi, Wako (JP);
Hirohiko Shimizu, Wako (JP); Chiko Otani, Wako (JP); Toshikazu Ebisuzaki, Wako (JP)

(73) Assignee: Riken, Saitama (JP)

( * ) Notice: Subject to any disclaimer, the term of this patent is extended or adjusted under 35 U.S.C. 154(b) by 33 days.

(21) Appl. No.: 10/499,968

(22) PCT Filed: Dec. 25, 2002

(86) PCT No.: PCT/JP02/13484

§ 371 (c)(1),
(2), (4) Date: Jan. 21, 2005

(87) PCT Pub. No.: WO03/056377

PCT Pub. Date: Jul. 10, 2003

(65) Prior Publication Data

US 2005/0122603 A1    Jun. 9, 2005

(30) Foreign Application Priority Data

Dec. 27, 2001 (JP) .............................. 2001-397998

(51) Int. Cl.
*G02B 23/06* (2006.01)
(52) U.S. Cl. .................... 359/365; 359/364; 359/399
(58) Field of Classification Search ................. 359/364, 359/365, 399
See application file for complete search history.

(56) References Cited

U.S. PATENT DOCUMENTS

| | | | |
|---|---|---|---|
| 3,745,347 A | 7/1973 | deBrey et al. | |
| 4,562,583 A | 12/1985 | Hoover et al. | |
| 4,941,163 A * | 7/1990 | Hoover ........................ | 378/43 |
| 5,565,983 A | 10/1996 | Barnard | |
| 5,753,935 A | 5/1998 | Kurakado et al. | |
| 5,818,649 A * | 10/1998 | Anderson .................... | 359/726 |
| 6,064,517 A * | 5/2000 | Chuang et al. .............. | 359/364 |

FOREIGN PATENT DOCUMENTS

| | | |
|---|---|---|
| EP | 0670576 A1 | 9/1995 |
| GB | 729546 | 5/1955 |
| JP | 59-222932 A | 12/1984 |
| JP | 3-274772 A | 12/1991 |
| JP | 5-75169 A | 3/1993 |
| JP | 7-253472 A | 10/1995 |

(Continued)

*Primary Examiner*—Joshua L Pritchett
(74) *Attorney, Agent, or Firm*—Birch, Stewart, Kolasch & Birch, LLP

(57) ABSTRACT

The light of a broad energy band can be observed by reflecting the light of the broad energy band, for example, the light from the visible light region to the x-ray region at a high reflectance respectively, by a composite telescope including a normal incidence optical system and an oblique incidence optical system. A broadband telescope comprise an oblique incidence optical system unit in which the light is obliquely incident on a surface part for reflecting the incident light, a normal incidence optical system unit in which the light is substantially vertically incident on a surface part for reflecting the incident light, and an analyzer for spectrum analysis of the light reflected by the surface part of the obliquely incidence optical system unit and the light reflected by the surface part of the normal incidence optical system unit.

5 Claims, 23 Drawing Sheets

FOREIGN PATENT DOCUMENTS

| | | |
|---|---|---|
| JP | 8-136821 A | 5/1996 |
| JP | 8-504974 A | 5/1996 |
| JP | 8-327452 A | 12/1996 |
| JP | 9-113697 A | 5/1997 |
| JP | 11-14913 A | 1/1999 |
| JP | 11-211895 A | 8/1999 |
| JP | 2002-228941 A | 8/2002 |
| JP | 2002-318157 A | 10/2002 |
| JP | 2002-350730 A | 12/2002 |
| WO | WO 01/41155 A1 | 6/2001 |

* cited by examiner

BROADBAND TELESCOPE

TECHNICAL FIELD

The present invention relates to a broadband telescope, more particularly to a broadband telescope suitable for using for astronomic observation where light of a broad energy band is made incident.

BACKGROUND ART

Conventionally, there is known a normal incidence telescope for observing light of a predetermined energy, which comprises a reflecting mirror, on the surface of which a multilayer film is formed and which reflects only light of a predetermined energy corresponding to the multilayer film at high reflectance, and a detector such as a semiconductor detector to which reflected light reflected by the reflecting mirror is condensed and which detects the light of a predetermined energy.

On the other hand, in the astronomic observation, since an apparent energy level considerably fluctuates due to collective motion and red shift, light is not observed in an energy band anticipated in rest system. A multilayer film of a conventional reflecting mirror has a narrow band in which only light of a predetermined energy is reflected at high reflectance, so that discovery of line spectrum in a celestial body, which fluctuates remarkably, is not expected.

Specifically, in the above-described astronomic observation, a telescope capable of observing the light in a broad energy band is desired. Particularly, since a complex index of refraction is approximately 1, and $\delta(=1-n)$ and extinction coefficient K is sufficiently smaller than 1 in a region extending from extreme ultraviolet ray to x-ray, a reflectance of normal incidence does not reach 1% in bulk. Besides, because light in a region extending from extreme ultraviolet ray to x-ray is absorbed by atmospheric air, a telescope capable of performing observation outside aerosphere is desired.

However, in the conventional normal incidence telescope, the multilayer film formed on the surface of the reflecting mirror exhibits high reflectance only to light of a predetermined energy, only the light of a predetermined energy reflected at high reflectance by the reflecting mirror can be observed, on which the multilayer film was formed, and there has been a problem that observation could not been performed with respect to light in a broad energy band which is the light in a region extending from visible light to x-ray, for example.

Further, in the conventional normal incidence telescope, single telescope can only observe the light of a predetermined energy corresponding to the multilayer film of the reflecting mirror, it is required to use a plurality of normal incidence telescopes each having the reflecting mirror on which the multilayer film reflecting light of different energy is formed in order to observe the light in a broad energy band by the conventional normal telescope. As a result, a new problem such as cost increase and securing of a wide space for arranging a plurality of normal incidence telescopes occurs.

Furthermore, when a plurality of the conventional normal incidence telescopes are used so as to have the reflecting mirrors on which the multilayer films reflecting light of different energy are formed, it is required to control a plurality of the normal incidence telescopes, there existed a problem of reduction of efficiency.

On the other hand, an oblique incidence optical system is known for obtaining high reflectance with respect to the region extending from visible light to x-ray, but the oblique incidence optical system has had various problems such as a narrow field of vision and a small effective area.

The present invention has been made in view of the above-described problems involved in prior art, and its object is to provide a broadband telescope that utilizes the advantages of the normal incidence optical system and the oblique incidence optical system well to make it possible to observe light in a broad energy band.

Further, another object of the present invention is to provide a broadband telescope in which a composite telescope of the normal incidence optical system and the oblique incidence optical system reflects each light rays in a broad energy band extending from visible light to x-ray, for example, at high reflectance to achieve cost reduction and space saving and to make it possible to efficiently observe the light in a broad energy band.

DISCLOSURE OF INVENTION

To achieve the above-described objects, the present invention comprises: an oblique incidence optical system unit where light is made incident obliquely to a surface part that reflects incident light; a normal incidence optical system unit where light is made incident substantially vertically to a surface part that reflects incident light; and a detector to which reflected light reflected by the surface part of the oblique incidence optical system unit and reflected light reflected by the surface part of the normal incidence optical system unit are made incident and which spectrally detects the incident light.

Therefore, according to the present invention, when the light in a broad energy band are made incident to the surface part of the oblique incidence optical system unit and the surface part of the normal incidence optical system unit, each light in the broad energy band that is the broad energy band extending from visible light to x-ray, for example, is reflected at high reflectance by the surface part of the oblique incidence optical system unit and the surface part of the normal incidence optical system unit, and the detector spectrally detects the light reflected by the surface part of the oblique incidence optical system unit and the surface part of the normal incidence optical system unit. Thus, the advantages of the normal incidence optical system and the oblique incidence optical system are utilized well and the light in the broad energy band can be severally observed.

Then, since a confocal composite telescope of the normal incidence optical system and the oblique incidence optical system reflects each light in a broad energy band at high reflectance, cost reduction and space saving can be achieved and the light in a broad energy band can be efficiently observed simultaneously.

Further, in the present invention, the normal incidence optical system unit may be located inside comparing to the oblique incidence optical system unit, and the detector may be located on an optical axis. This realizes further space saving and the entire telescope can be smaller.

Furthermore, the present invention comprises: an oblique incidence optical system unit, which has a first reflecting mirror reflecting incident light at a first surface part made up of paraboloid of revolution, and a second reflecting mirror reflecting light, which is reflected at the surface part of the first mirror, at a second surface part made up of hyperboloid of revolution; a normal incidence optical system unit, which has a third reflecting mirror that has a third surface part on which a multilayer film is formed, which continuously changes a periodic length along its depth direction to reflect each light of a predetermined energy in a region extending from vacuum ultraviolet ray to extreme ultraviolet ray and has high reflectance due to total reflection over a visible light region, and reflects the incident light at the third surface part, and a fourth reflecting mirror that has a fourth surface part on which a multilayer film is formed, which continuously changes the periodic length along its depth direction corresponding to the third surface part of the third reflecting mirror to reflect each light of a predetermined energy in the region extending from vacuum ultraviolet ray to extreme ultraviolet ray and has high reflectance due to total reflection over the visible light region, and reflects the light, which is reflected at the third surface part of the third reflecting mirror, at the fourth surface part; and a detector to which reflected light reflected at the second surface part of the second reflecting mirror and reflected light reflected at the fourth reflecting mirror are made incident and which spectrally detects the incident light.

Thus, according to the present invention, when light in a broad energy band are made incident to the first surface part of the first reflecting mirror of the oblique incidence optical system unit and the third surface part of the third reflecting mirror of the normal incidence optical system unit, the oblique incidence optical system unit reflects each light in a region extending from visible light to hard x-ray out of the light in a broad energy band at high reflectance, the normal incidence optical system unit reflects each light in a region extending from visible light to extreme ultraviolet ray out of the light in a broad energy band at high reflectance, and the detector spectrally detects the light reflected at the surface part of the oblique incidence optical system unit and the surface part of the normal incidence optical system unit, so that the light in a broad energy band, particularly the light in the region extending from visible light to x-ray can be observed.

Then, since the confocal composite telescope of the normal incidence optical system and the oblique incidence optical system reflects each light in a broad energy band at high reflectance, cost reduction and space saving can be achieved and the light in a broad energy band can be efficiently observed simultaneously.

Further, in the present invention, the first reflecting mirror and the second reflecting mirror of the oblique incidence optical system unit constitute an aspherical reflecting mirror of an approximate cylindrical shape, the normal incidence optical system unit is located within the inner diameter side of the aspherical reflecting mirror, and the detector is located on the optical axis. This realizes further space saving and the entire telescope can be smaller.

Furthermore, in the present invention, the detector may be a superconducting tunnel junction device.

Accordingly, with the superconducting tunnel junction device that functions as a detector having high sensitivity and spectroscopic capability in a broadband extending from infrared ray to x-ray, each light in a broad energy band reflected by a single or a plurality of reflecting mirror(s) can be spectrally detected by a single detector.

Moreover, in the present invention, the telescope may comprise a filter that makes only light, which has higher energy than the reflected light reflected at the surface part of the normal incidence optical system unit out of the reflected light reflected at the surface part of the oblique incidence optical system unit, incident selectively to the detector.

Consequently, since only light having a predetermined energy out of the reflected light reflected at the surface part of the oblique incidence optical system unit is made incident selectively to the detector corresponding to the reflected light reflected at the surface part of the normal incidence optical system unit, it becomes possible to change a range of energy of the reflected light made incident from each of the oblique incidence optical system unit and the normal incidence optical system unit to the detector by the filter.

EXPLANATION OF REFERENCE NUMERALS

Figure 1:
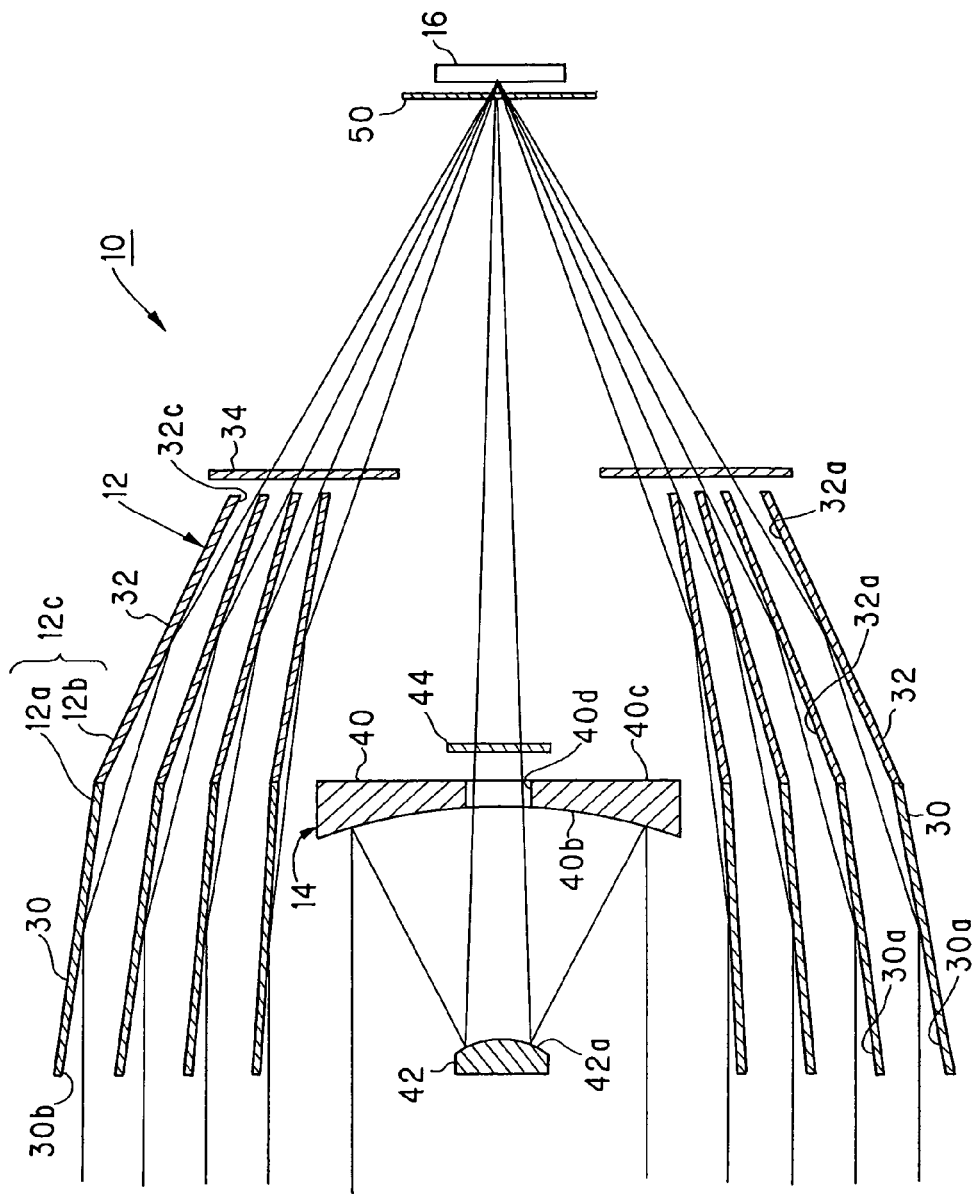
FIG. 1 is an explanatory view of a conceptual constitution illustrating an example of an embodiment of a broadband telescope according to the present invention.

10 Broadband telescope
12 Oblique incidence optical system unit
12$a$ Paraboloid
12$b$ Hyperboloid
12$c$ Aspherical reflecting mirror 14 Normal incidence optical system unit
16 Superconducting tunnel junction device
20 Main unit
20a Inside
20b Bottom part
20c Opening
20d Front section
20e Rear section
20f Wall
20g Support
20h Front arm
20i Rear arm
30, 32 Reflecting mirror
30a, 32a Surface part
30b, 30c, 32b, 32c End part
34, 44, 50 Filter
34a Hole
40, 42 Reflecting mirror
40a Main unit
40b, 42a Surface part
40c Rear surface part
40d Hole part
40e Multilayer film
40e-1 First layer
40e-2 Second layer
40ee Surface

BEST MODE FOR IMPLEMENTING THE INVENTION

Hereinafter, the embodiments of the broadband telescope according to the present invention will be described in detail with reference to the accompanying drawings.

Figure 2:
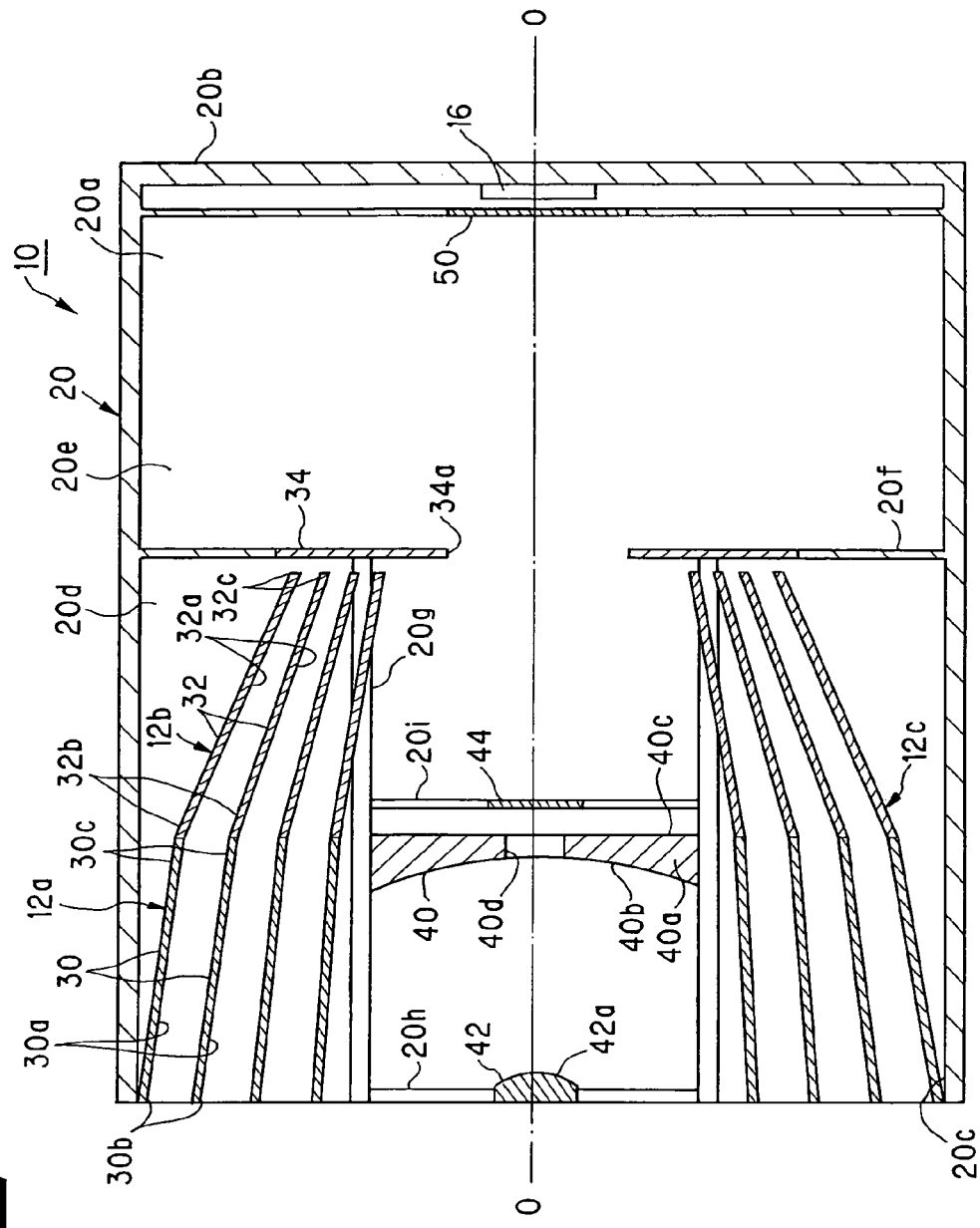
FIG. 2 is an explanatory view of a schematic constitution illustrating an example of an embodiment of a broadband telescope according to the present invention.

FIG. 1 shows the explanatory view of a conceptual constitution illustrating an example of the embodiments of the broadband telescope according to the present invention, and FIG. 2 shows the explanatory view of a schematic constitution illustrating an example of the embodiments of the broadband telescope according to the present invention.

The broadband telescope 10 according to the present invention is constituted to comprise an oblique incidence optical system unit 12 where light is made incident to reflecting mirrors 30 obliquely, a normal incidence optical system unit 14 where light is made incident to a reflecting mirror 40 approximately vertically, and a superconducting tunnel junction device (STJ) 16 as a detector into which the reflected light from the oblique incidence optical system unit 12 and the reflected light from the normal incidence optical system unit 14 are condensed.

It is to be noted that, as shown in FIG. 2, the broadband telescope 10 according to the present invention comprises a cylindrical main unit 20 whose inside 20a is hollow. One end part of the main unit 20 is closed by an approximately circular bottom part 20b, and the other end part is open by an approximately circular opening 20c. Further, the telescope has a wall 20f, which divides the main unit 20 into a front section 20d and a rear section 20e, and a support 20g extended from the wall 20f.

Further, the central axis of the main unit 20 coincides with an axis passing through the center of the optical system of the oblique incidence optical system unit 12 that is an axis passing through the center of the optical system of the normal incidence optical system unit 12, that is, an axis o-o (refer to dashed line in FIG. 2) of the broadband telescope 10.

Figure 3:
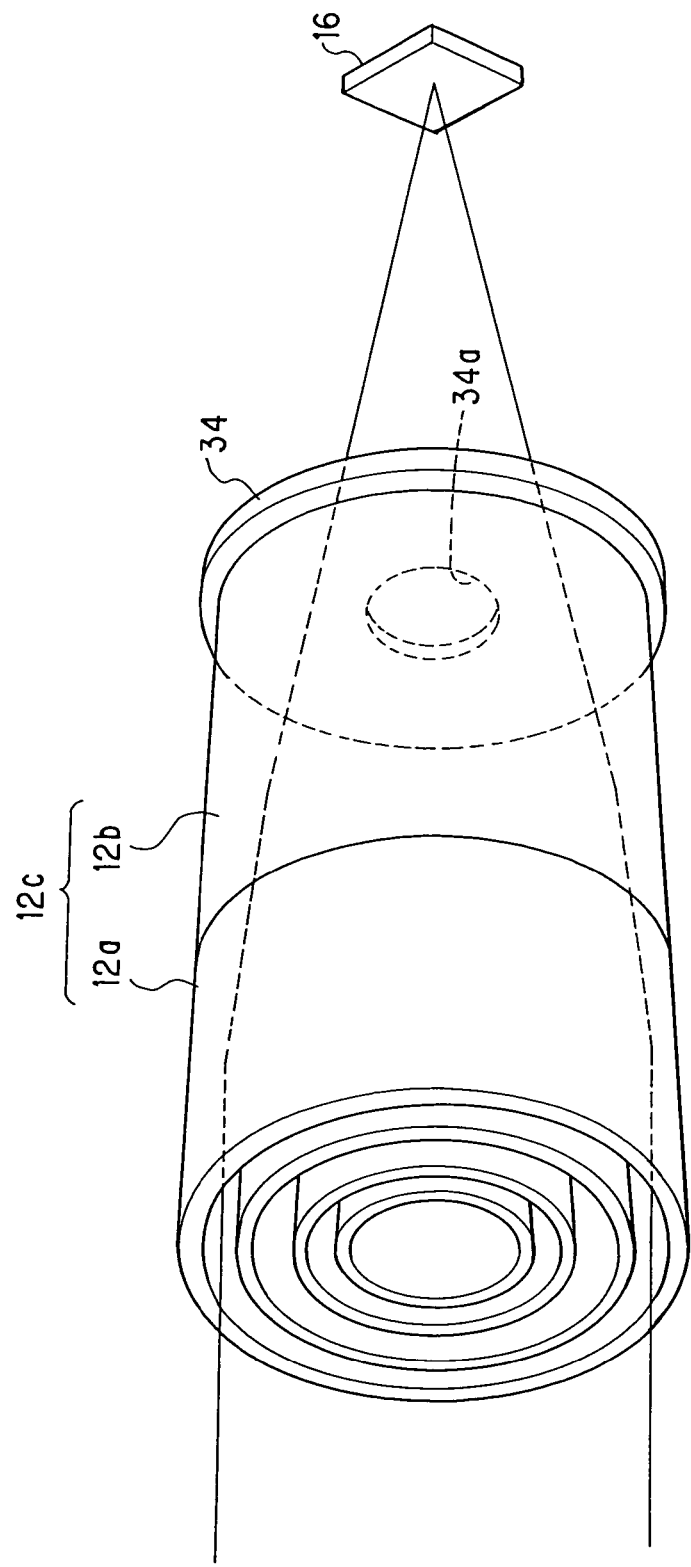
FIG. 3 is a perspective explanatory view illustrating mainly an oblique incidence optical system unit of the broadband telescope according to the present invention.

Herein, the oblique incidence optical system unit 12 is constituted to comprise approximately cylindrical aspherical reflecting mirrors 12c of so-called Wolter type I and a filter 34 disposed on the wall 20f of the main unit 20 (refer to FIG. 3).

The aspherical reflecting mirror 12c is constituted by a paraboloid 12a, which consists of a plurality of reflecting mirrors 30 disposed near the opening 20c of the front section 20d of the main unit, and a hyperboloid 12b that consists of a plurality of reflecting mirrors 32 near the wall 20f of the main unit 20.

The entire body of each of a plurality of the reflecting mirrors 30, which constitute the paraboloid 12a, is in an approximately cylindrical body and includes a surface part 30a formed as the paraboloid of revolution. On the other hand, the entire body of each of a plurality of the reflecting mirrors 32, which constitute the hyperboloid 12b, is in an approximately cylindrical body and includes a surface part 32a formed as the hyperboloid of revolution. Then, Au (gold) or Pt (platinum) is coated on the surface part 30a of the reflecting mirrors 30 and the surface part 32a of the reflecting mirrors 32.

Then, the reflecting mirrors are disposed concentrically around the optical axis o-o in a multiple state such that each of a plurality of the reflecting mirrors 30 and each of a plurality of the reflecting mirrors 32 corresponds one to one, and the paraboloid 12a and the hyperboloid 12b are arranged in this order from the opening 20c of the main unit 20. Specifically, one end part 30b of the reflecting mirrors 30 with the paraboloid 12 is located near the opening 20c of the main unit 20, the other end part 30c of the reflecting mirrors 30 and one end part 32b of the reflecting mirrors 32 are adjacent to each other, and another end part 32c of the reflecting mirrors 32 is located closer to the wall 20f of the main unit 20.

The filter 34 is in an approximate ring shape where an approximate circular hole 34a is formed at the central area, which is disposed in the wall 20f of the main unit 20 and located near the end part 32c of the reflecting mirrors 32. The filter 34 blocks light having energy same as that of extreme ultraviolet ray or less.

Figure 4:
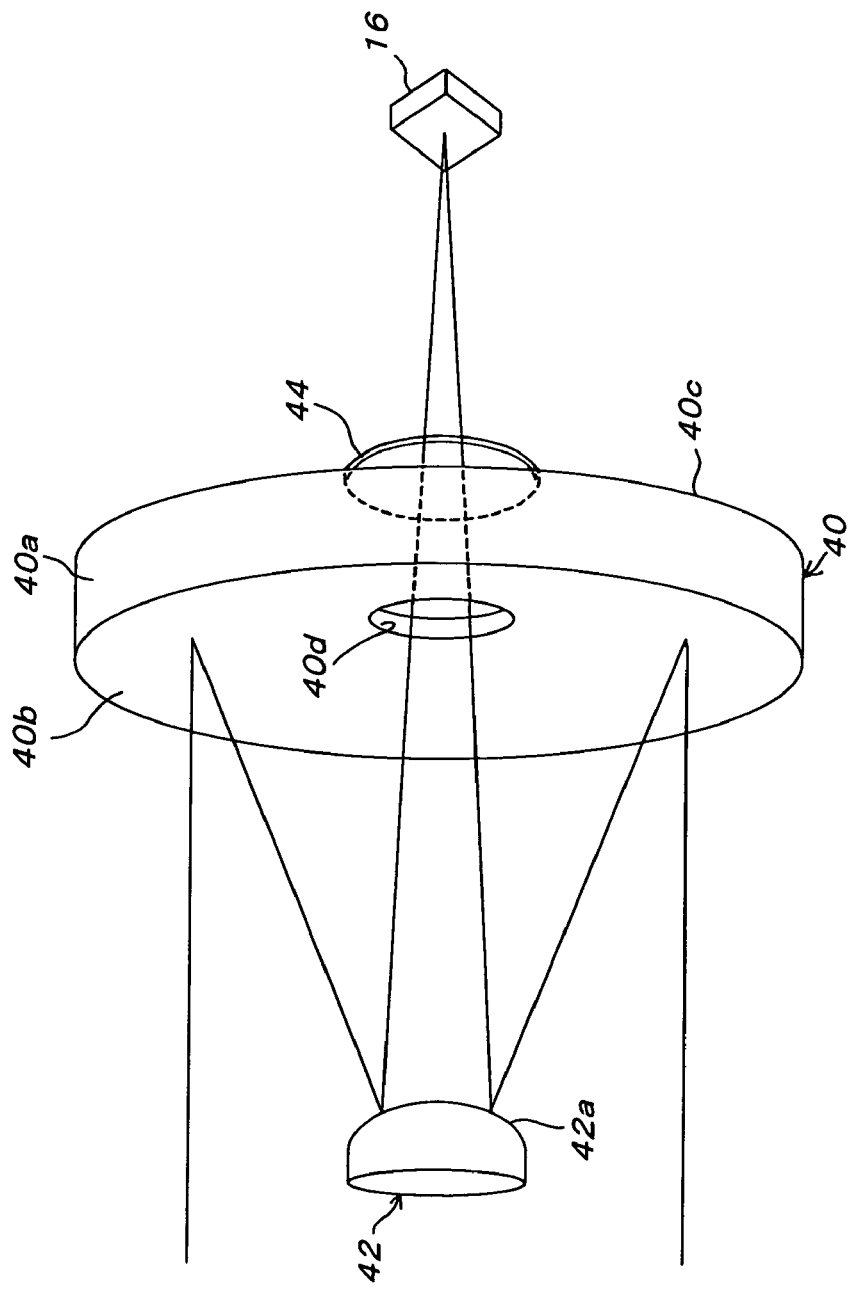
FIG. 4 is a perspective explanatory view illustrating mainly a normal incidence optical system unit of the broadband telescope according to the present invention.

On the other hand, the normal incidence optical system unit 14 is located within the inner diameter side of the approximately cylindrical aspherical reflecting mirrors 12c, which consist of the paraboloid 12a and the hyperboloid 12b of the oblique incidence optical system unit 12, and is constituted to comprise a reflecting mirror 40 supported by the support 20g in the front section 20d of the main unit 20, a reflecting mirror 42 supported by the front arm 20h extended from the support 20g, and a filter 44 supported by rear arm 20i extended from the support 20g (refer to FIG. 4).

The normal incidence optical system unit 14, which consists of the reflecting mirror 40, the reflecting mirror 42 and the filter 44, constitutes a so-called Cassegrain-type telescope within the inner diameter side of the aspherical reflecting mirror 12c of the oblique incidence optical system unit 12.

In other words, the surface part 40b of the reflecting mirror as the primary mirror and the surface part 42a of the reflecting mirror 42 as a secondary mirror face each other, the reflecting mirror 42 as the secondary mirror turns back an optical path, and focuses it on the rear surface part 40c of the reflecting mirror 40 as the primary mirror. It is to be noted that the superconducting tunnel junction device 16 is arranged on the focused position in this embodiment. Further, the reflecting mirror 40, the reflecting mirror 42 and the filter 44 are disposed such that the center of the reflecting mirror 40, the center of the reflecting mirror 42 and the center of the filter 44 coincide with the optical axis o-o of the broadband telescope 10.

The entire reflecting mirror 40 is in a circular dish-shaped body 40a, and a hole part 40d that opens on the surface part 40b and the rear surface part 40c is formed on the central area. Further, the surface part 40b of the dish-shaped body 40a is formed as the paraboloid of revolution, which is concavely recessed centering around the hole part 40d (refer to FIG. 4 and FIGS. 5(a), (b)).

Then, in the entire region of the surface part 40b of the approximately ring shape, a first layer 40e-1 having a predetermined refractive index is formed and a second layer 40e-2, which has a refractive index different from the refractive index of the first layer 40e-1, is laminated on the first layer 40e-1. Furthermore, the first layer 40e-1 and the second layer 40e-2 laminated on the first layer 40e-1 make one set, a predetermined number n ('n' is a positive integer) of laminations are laminated to form a multilayer film 40e on the surface part 40b.

Specifically, the first layer 40e-1 is made from heavy element such as Ni (nickel) and Mo (molybdenum), for example, while the second layer 40e-2 is made from light element such as C (carbon) and Si (silicon), for example.

Thus, when thin films having different refractive indexes are superposed in a multilayered state and a periodic length d, which corresponds to the film thickness of a set of the first layer 40e-1 and the second layer 40e-2, is formed so as to utilize Bragg reflection, light made incident to the multilayer film is reflected at the boundary surface between the first layer 40e-1 and the second layer 40e-2 to cause interference of the light reflected at the boundary surface between the first layer 40e-1 and the second layer 40e-2, and light having a predetermined energy is reflected at high reflectance.

Herein, the multilayer film 40e formed on the surface part 40b of the reflecting mirror 40 is a multilayer film having different periodic lengths d. In short, the periodic lengths d of the multilayer film 40e are continuously changed in the depth direction (refer to FIG. 5(b)). More specifically, in the multilayer film 40e formed on the surface part 40b of the reflecting mirror 40, the periodic length d is designed to be shorter as a set of layers backs away from a surface 40ee and the periodic length d is designed to be longer as it approaches the surface 40ee along the depth direction of the multilayer film 40e.

Figure 5B:
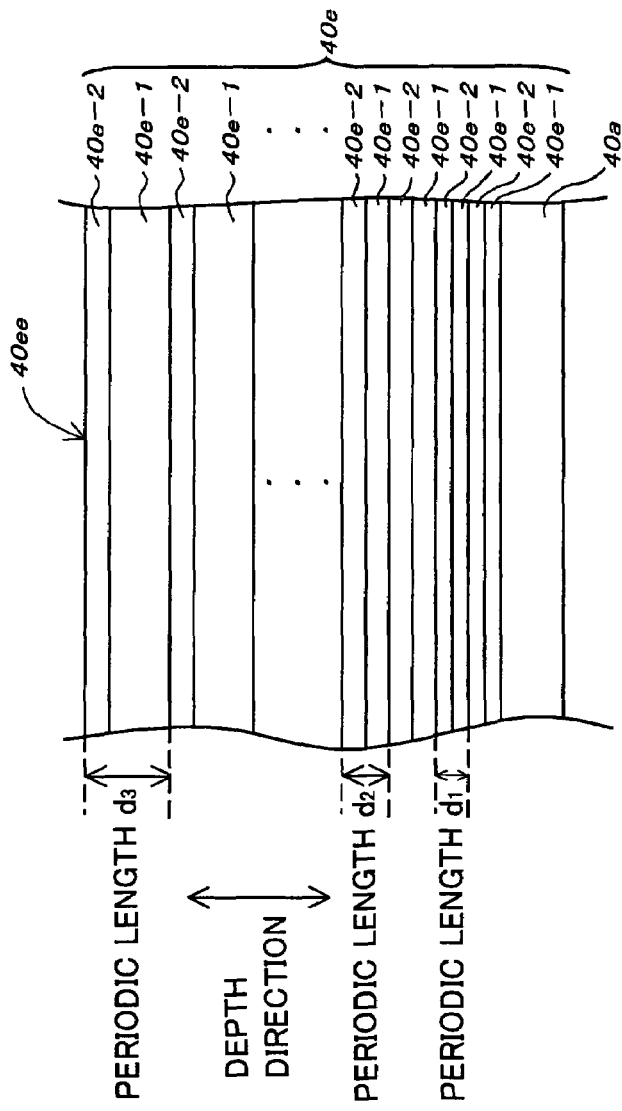
FIG. 5($a$) is an explanatory view illustrating mainly the surface part of a reflecting mirror as a primary mirror of the normal incidence optical system unit of the broadband telescope according to the present invention, and FIG. 5($b$) is a partially enlarged explanatory view of A-A sectional view in FIG. 5($a$).
Figure 5A:
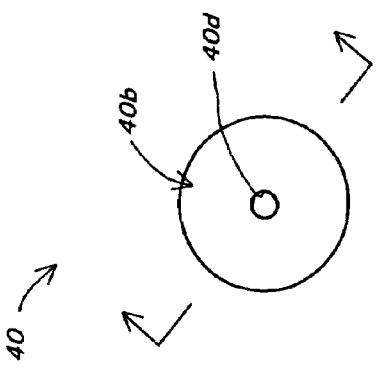

Therefore, as shown in FIG. 5(b), a periodic length $d_1$ farthermost away from the surface 40ee, a periodic length $d_2$ at the halfpoint in the depth direction, and a periodic length $d_1$ in the vicinity of the surface 40ee of the multilayer film 40e are in the relationship of the periodic length $d_1$ < the periodic length $d_2$ < the periodic length $d_3$.

The periodic lengths d of the multilayer film 40e formed on the surface part 40b of the reflecting mirror 40 are designed to be continuously changed in the depth direction of the multilayer film 40e so as to correspond to each light having a predetermined energy in the range extending from vacuum ultraviolet ray to extreme ultraviolet ray. Accordingly, energy of light reflected on the boundary surface between the first layer 40e-1 and the second layer 40e-2 utilizing Bragg reflection is different on different periodic lengths d (periodic length $d_1$, $d_2$, $d_3$, for example) in the multilayer film 40e of the reflecting mirror 40.

It is to be noted that, in this specification, the "multilayer film where the periodic lengths d are continuously changed in the depth direction" is optionally referred to as a "supermirror".

On the other hand, the surface portion 42a of the reflecting mirror 42 has a convex surface and is constituted by the supermirror. The supermirror of the reflecting mirror 42 is designed corresponding to various conditions such as the type and the focal length of the supermirror that constitutes the surface part 40b as the concave surface of the reflecting mirror 40. Then, the surface part 42a of the reflecting mirror 42 reflects light reflected at the surface part 40b of the reflecting mirror 40 at high reflectance.

It is to be noted that known technology can be used to form the supermirror on the surface part 40b of the reflecting mirror 40 and the surface part 42a of the reflecting mirror 42, and the detailed description of a deposition apparatus and a deposition method will be omitted.

Further, the filter 44 is in an approximate disc-shaped body, which is supported by the rear support 20i of the main unit 20 and located in the vicinity of the hole part 40d of a rear surface part 40c side of the reflecting mirror 40. The filter 44 adjusts the quantity of light.

Next, the superconducting tunnel junction device 16 is a type of a Josephson device, which has a structure that a thin insulation film (aluminum oxide, for example) is sandwiched by superconducting metal thin films (niobium, aluminum, titanium, for example).

The superconducting tunnel junction device 16 is a detector to which the reflected light from the oblique incidence optical system unit 12 and the reflected light from the normal incidence optical system unit 14 are condensed, as described above. More specifically, it operates at cryogenic temperature of approximately 0.3K, and when light is made incident to the superconducting tunnel junction device 16, energy of the incident light is absorbed by the superconducting metal thin films.

Subsequently, when the energy of the incident light is absorbed by the superconducting thin films of the superconducting tunnel junction device 16, dissociation of Cooper pair and generation of phonons in the superconducting metal thin films are caused. Moreover, process where the generated phonons dissociate Cooper pair is caused within the time of approximately $10^{-12}$ second.

At this point, quasiparticles are produced and the quasiparticles pass through the insulation film by quantum tunneling effect, so that electric current in proportion to the energy of incident light is generated and taken out as a signal by using a predetermined circuit system, and the device operates as the detector.

As described, the superconducting tunnel junction device 16 functions as a detector having high sensitivity and spectroscopic capability in a broadband extending form infrared ray to x-ray.

Figure 6A:
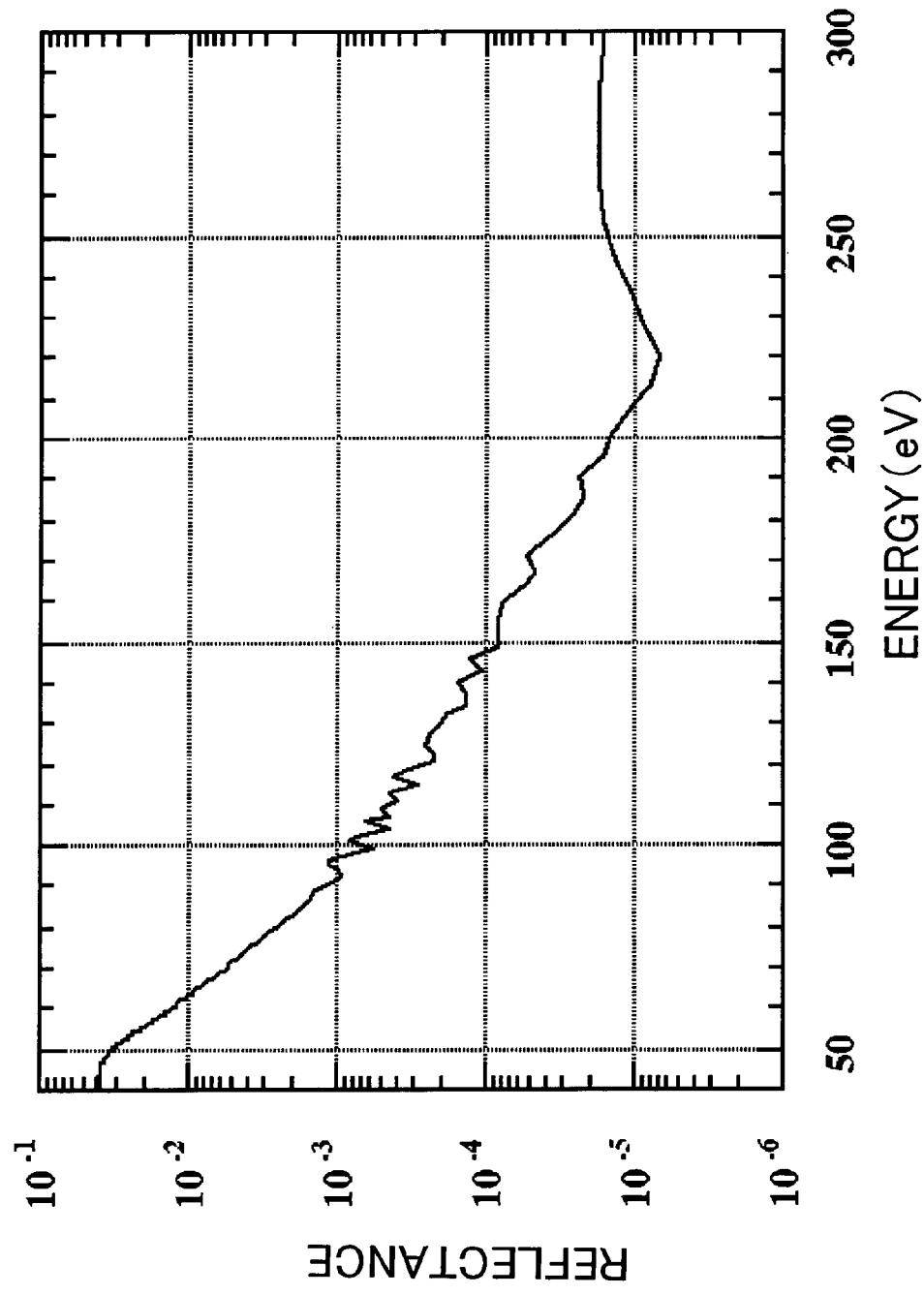
FIG. 6($a$) is a graph illustrating the reflectance of the surface of a superconducting tunnel junction device, and FIG. 6($b$) is a graph indicating the transmittance of the superconducting tunnel junction device.
Figure 6B:
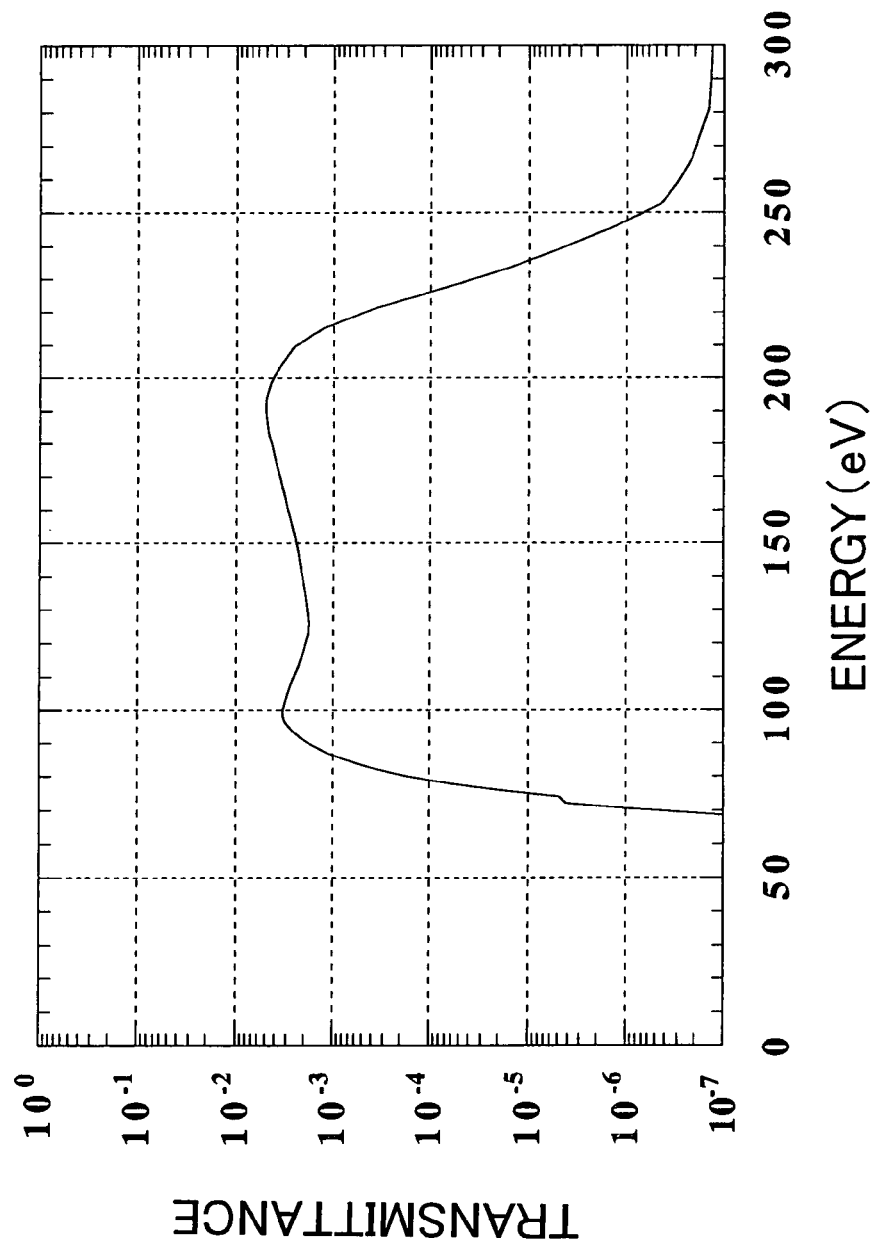

Specifically, FIG. 6(a) shows the reflectance on the surface of the superconducting tunnel junction device 16, and FIG. 6(b) shows the transmittance of the superconducting tunnel junction device 16. As it is clear from the reflectance and transmittance of the superconducting tunnel junction device 16, photon absorptance of the superconducting tunnel junction device 16 is 95% or higher.

Moreover, the superconducting tunnel junction device 16 has very high photon absorptance in the region extending from extreme ultraviolet to soft x-ray, so that when the superconducting tunnel junction device 16 having behavior of producing signals by photon absorption as described above, spectral detection of light is realized in a region extending from visible light to hard x-ray.

Figure 7:
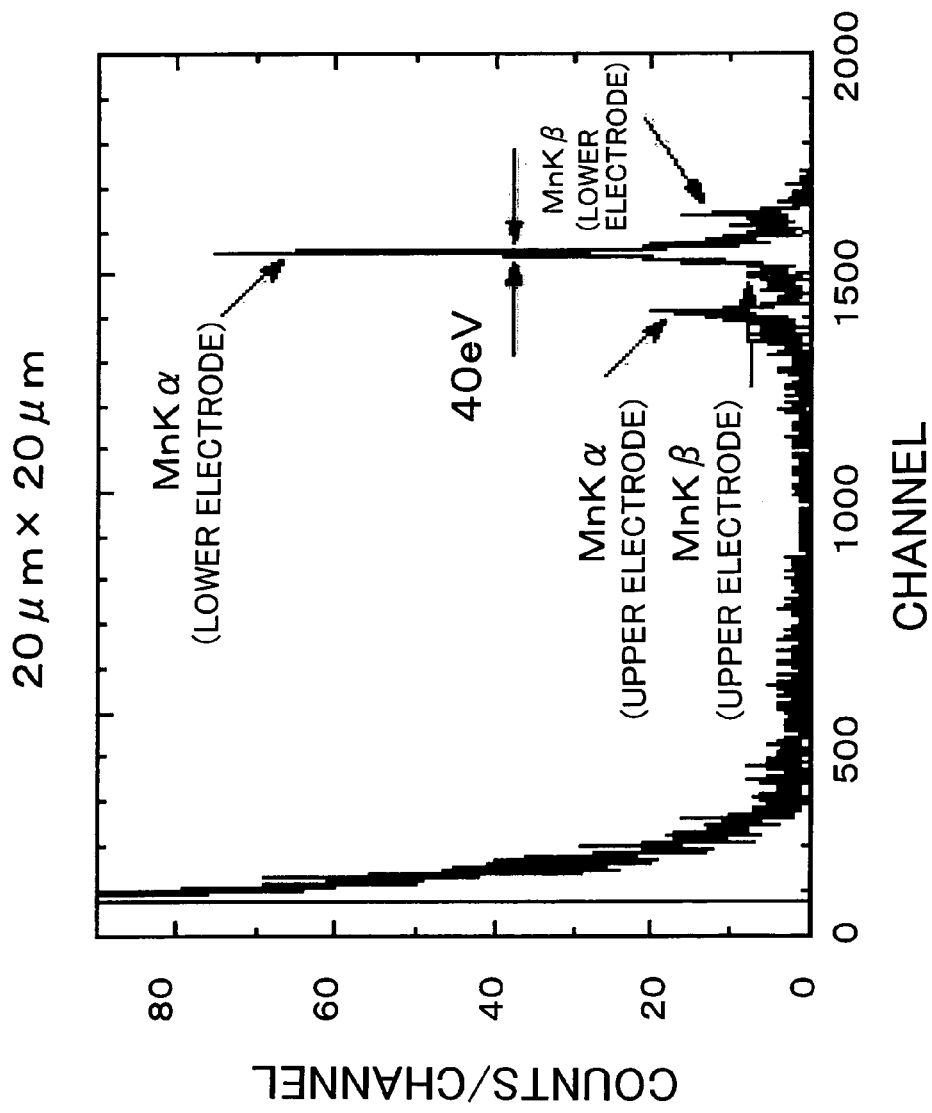
FIG. 7 is a graph illustrating an example of energy resolution in a region extending from extreme ultraviolet ray to x-ray of the superconducting tunnel junction device.
Figure 8:
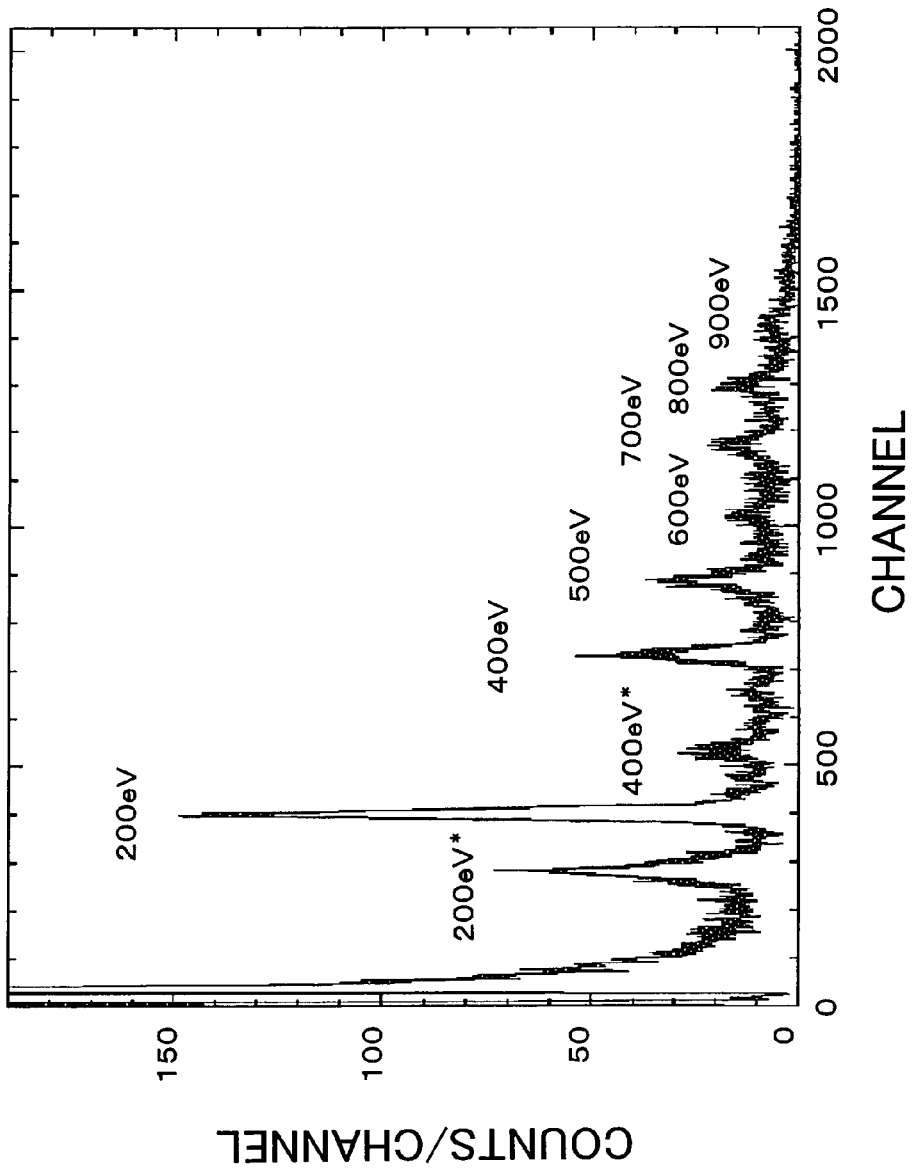
FIG. 8 is a graph illustrating an example of energy resolution in an x-ray region of the superconducting tunnel junction device.
Figure 9A:
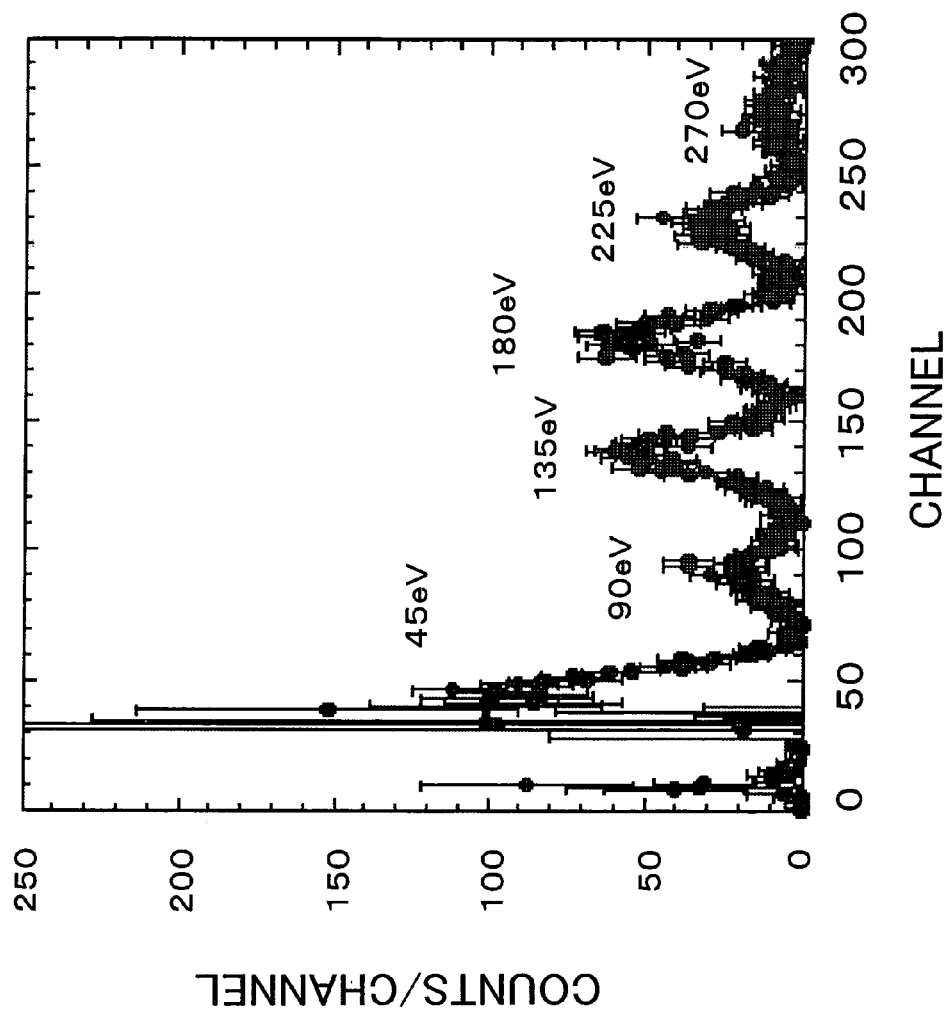
FIGS. 9($a$), ($b$), ($c$) and ($d$) are graphs illustrating examples of energy resolution in a soft x-ray region of the superconducting tunnel junction device, and FIGS. 9($e$), ($f$), ($g$) a ($h$) are graphs illustrating examples of energy resolution in an extreme ultraviolet ray region of the superconducting tunnel junction device.
Figure 9B:
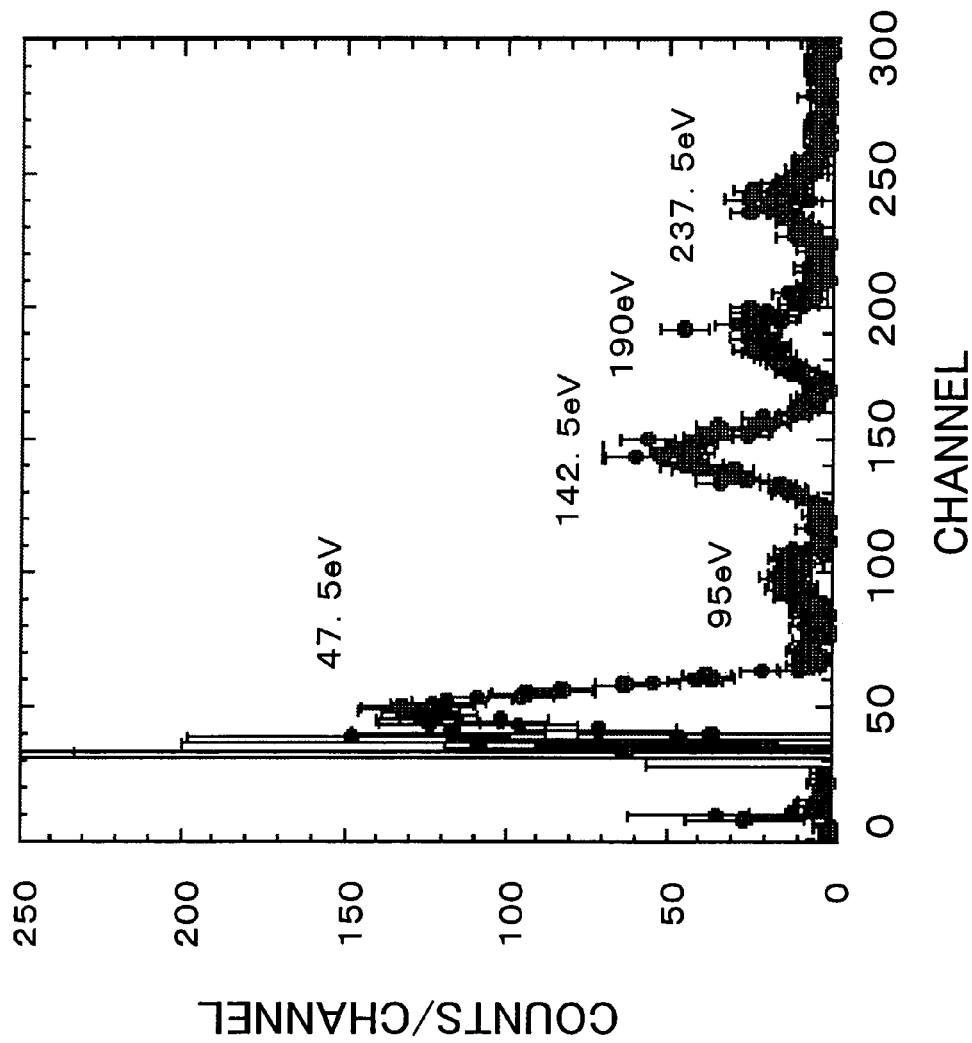
Figure 9C:
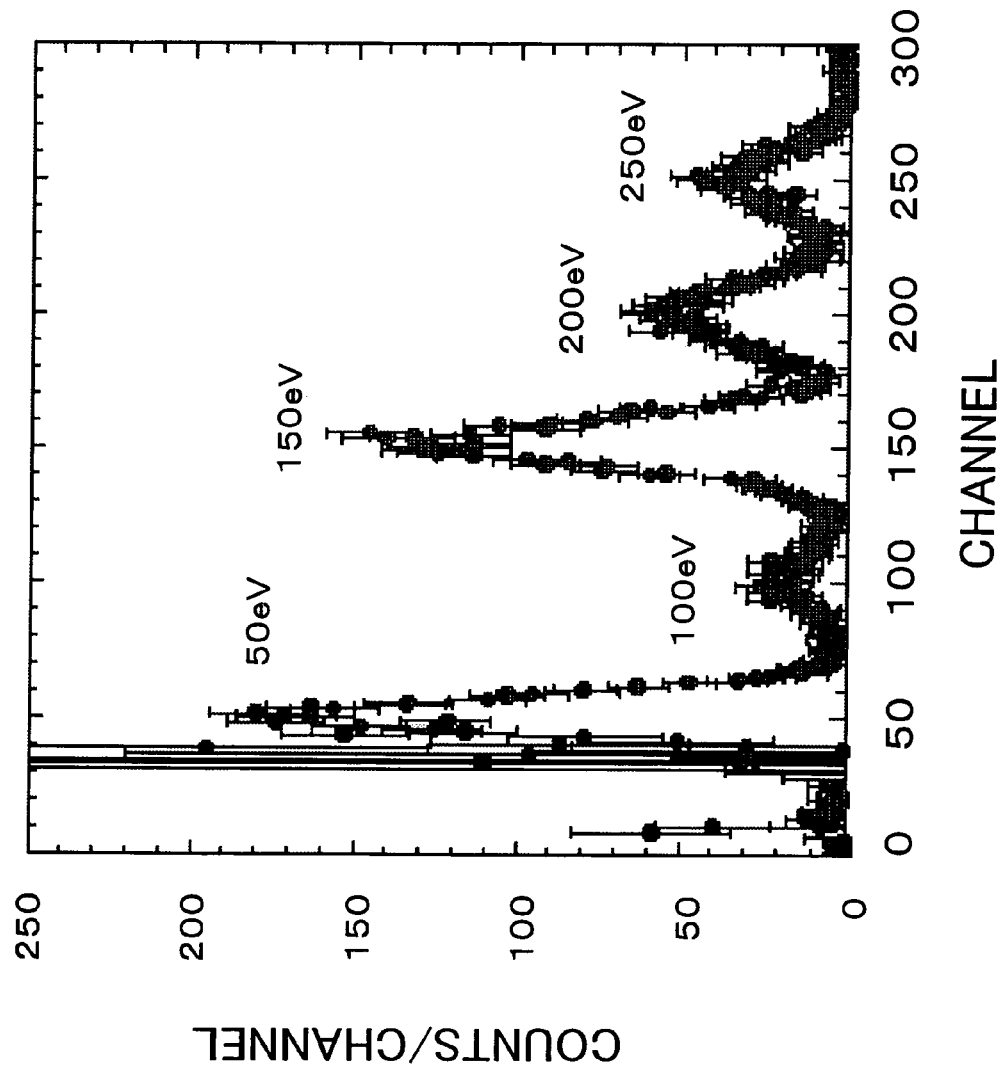
Figure 9D:
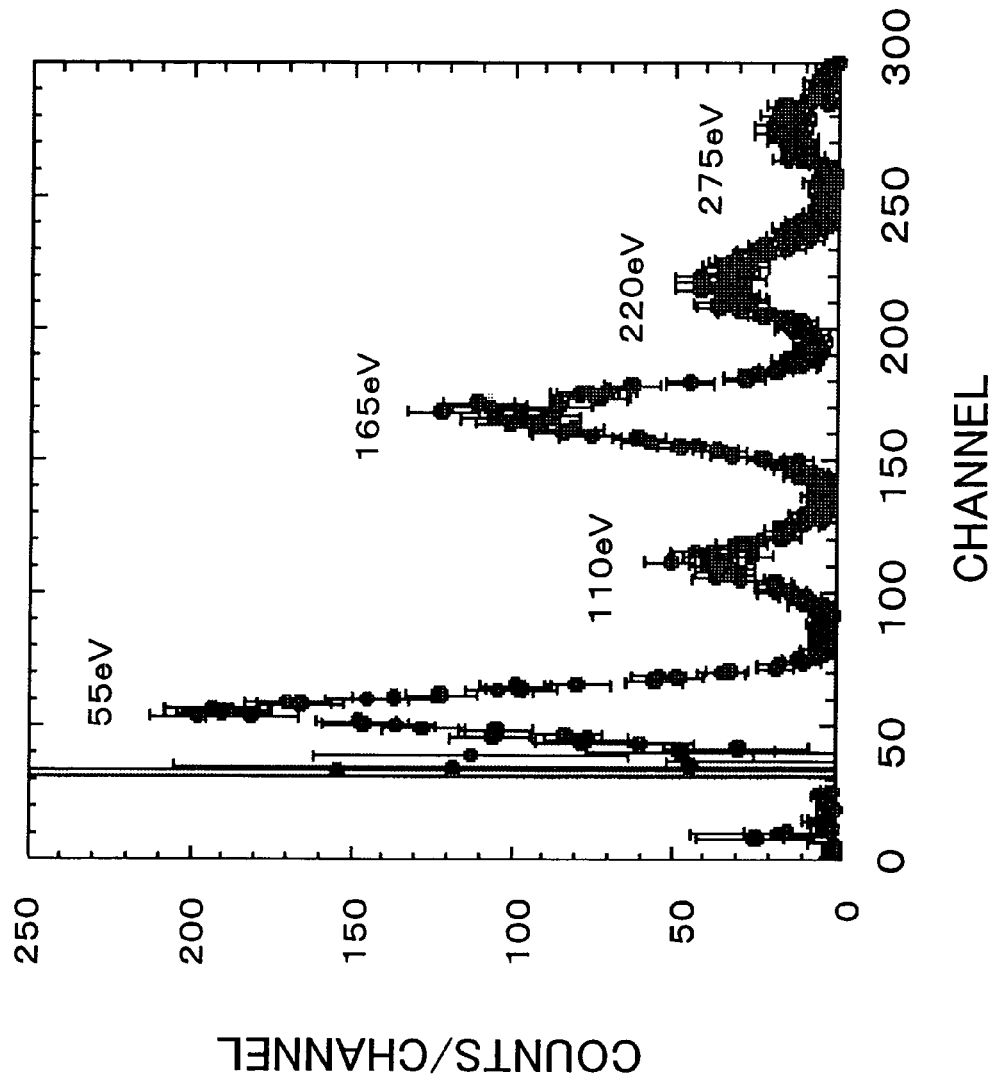
Figure 9E:
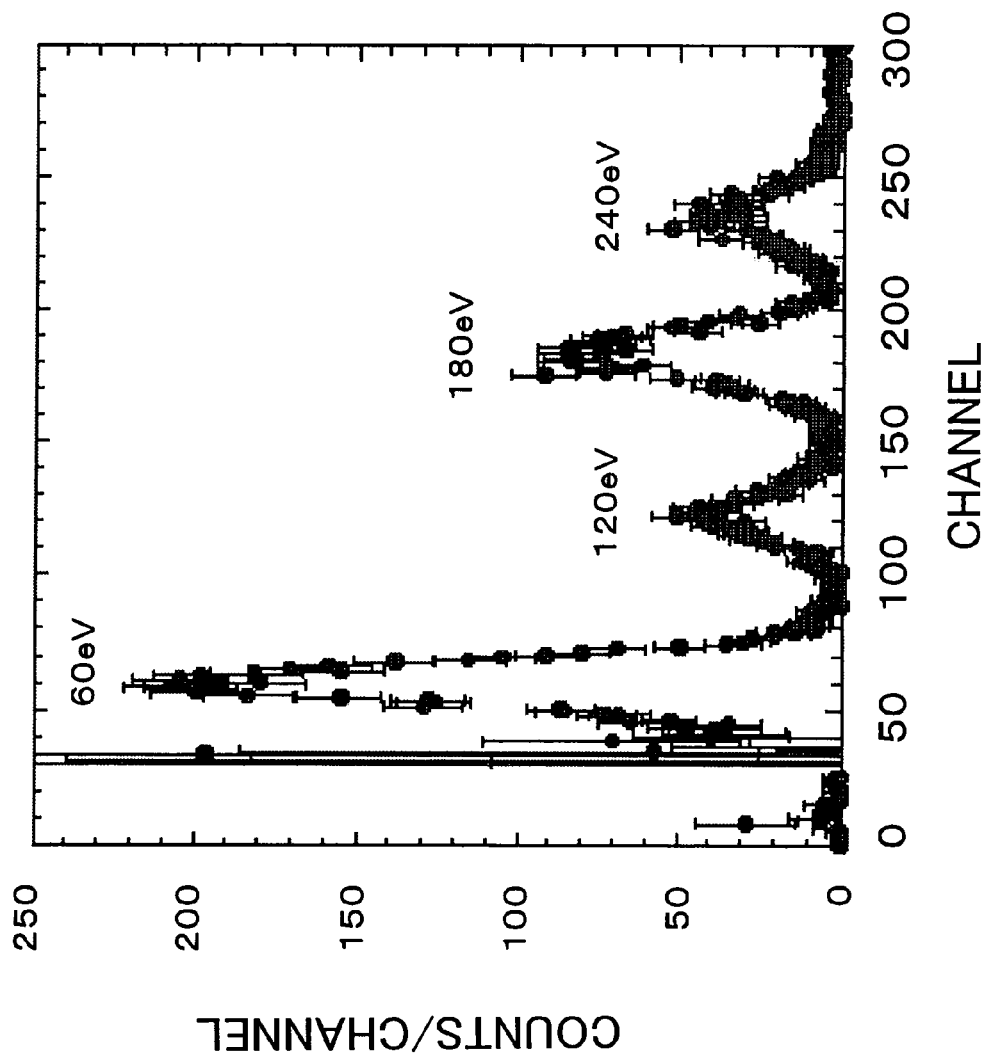
Figure 9F:
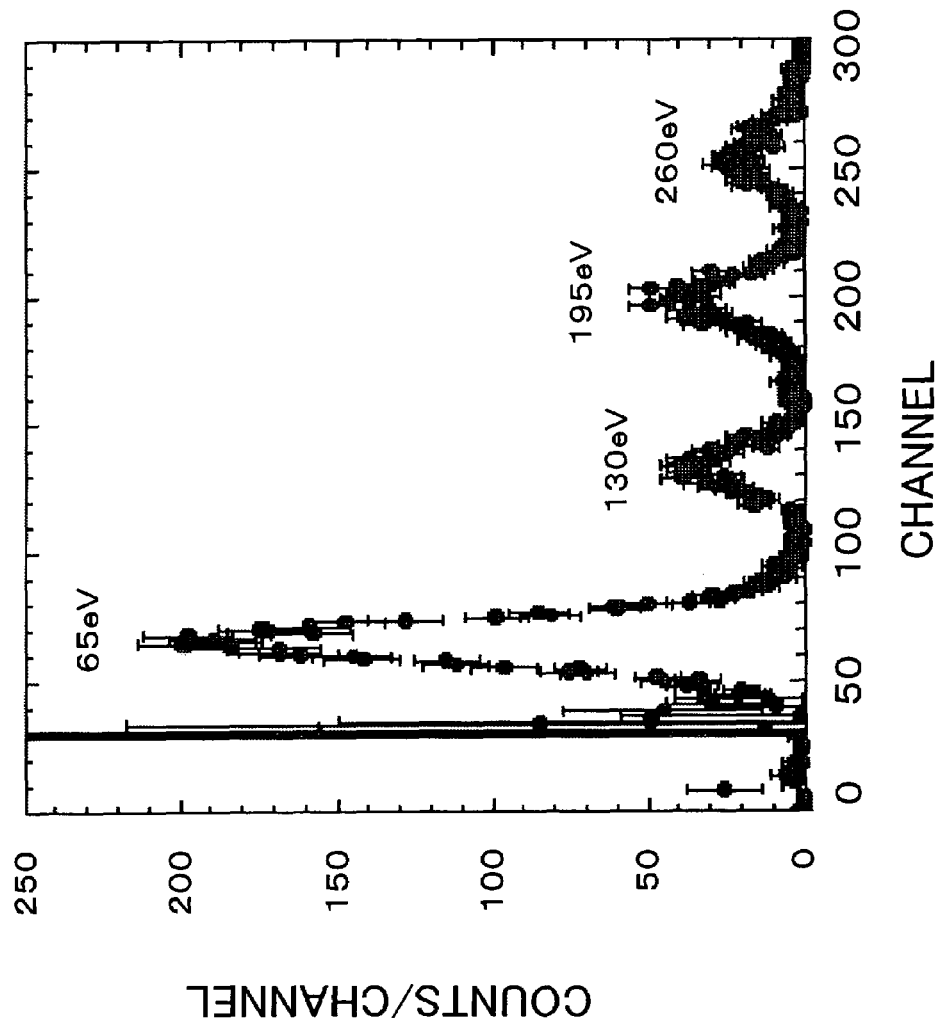
Figure 9G:
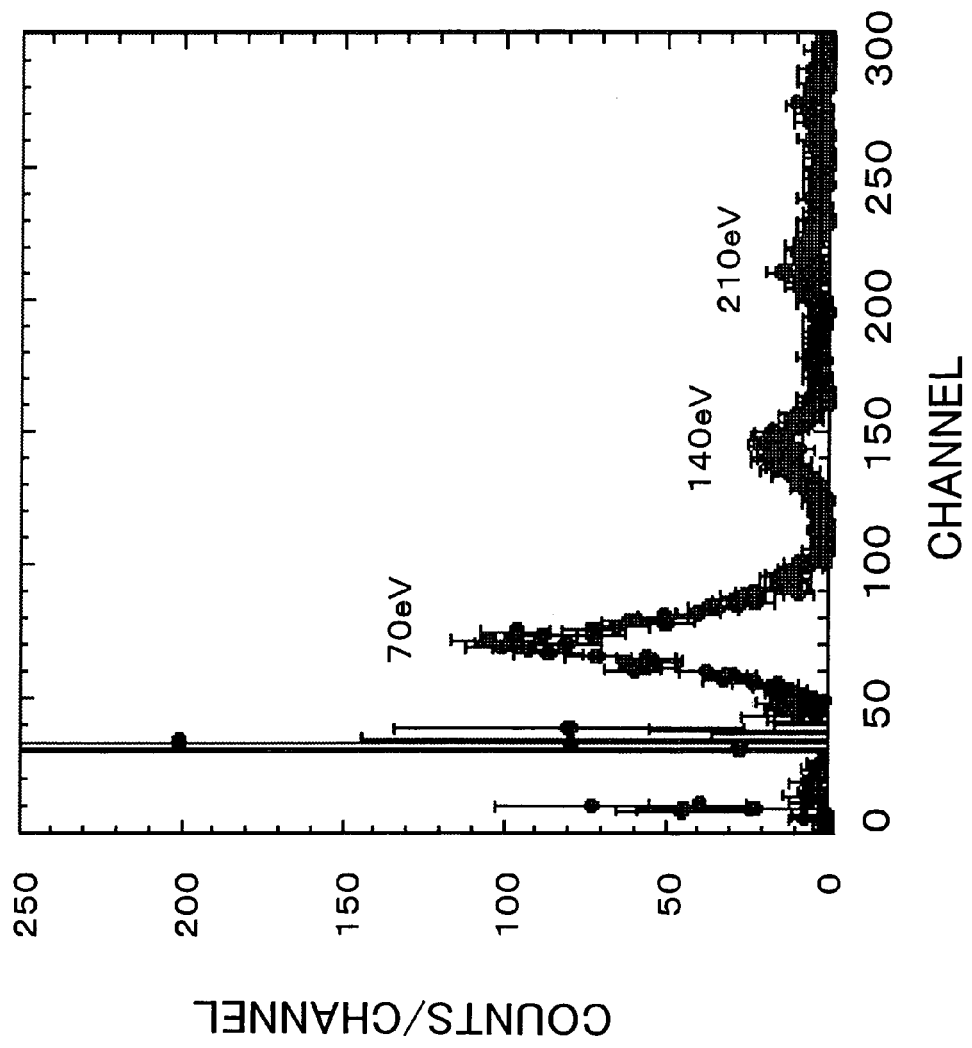
Figure 9H:
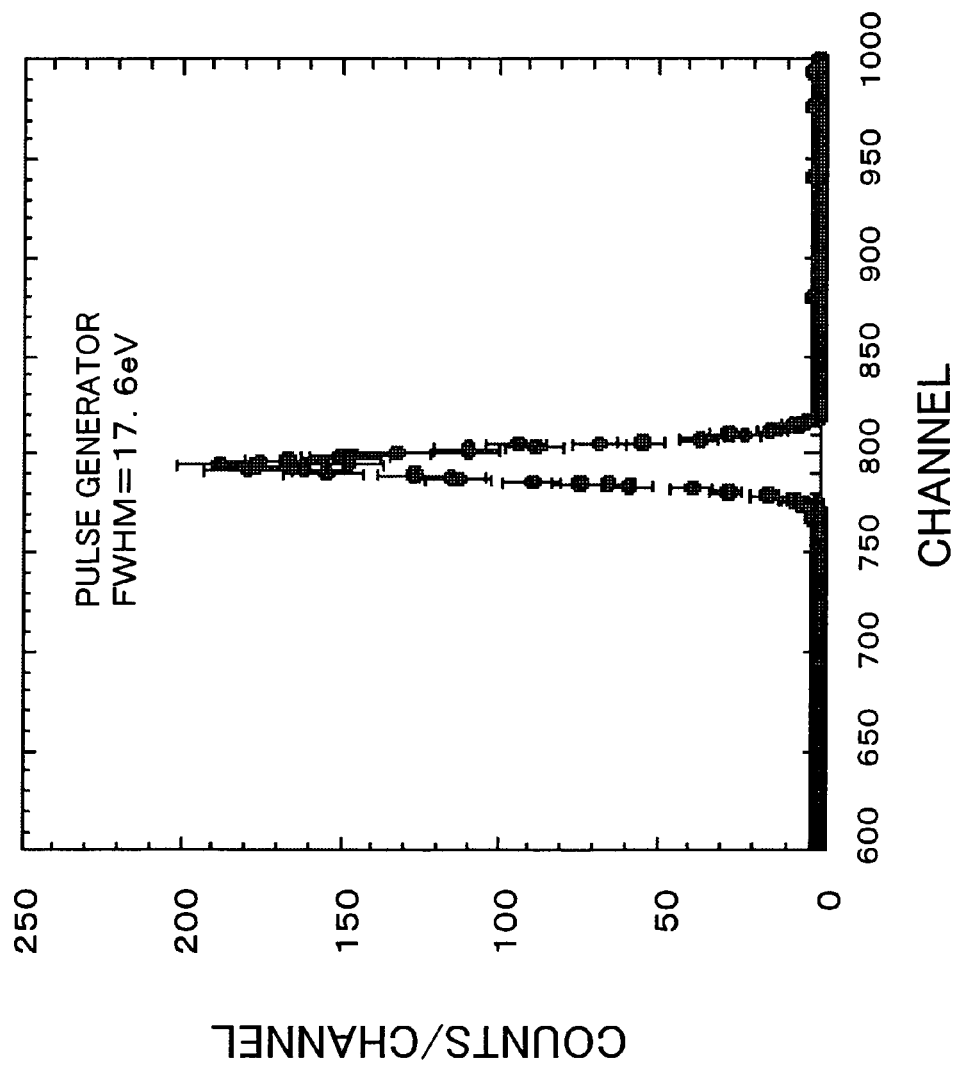

Meanwhile, FIG. 7 shows the graph illustrating an example of energy resolution in a region extending from extreme ultraviolet ray to x-ray of the superconducting tunnel junction device 16, FIG. 8 shows the graph illustrating an example of energy resolution in an x-ray region of the superconducting tunnel junction device 16, FIGS. 9(a), (b), (c) and (d) shows the graphs illustrating examples of energy resolution in a soft x-ray region of the superconducting tunnel junction device 16, and FIGS. 9(e), (f), (g) and (h) shows the graphs illustrating examples of energy resolution in an extreme ultraviolet ray region of the superconducting tunnel junction device 16.

Then, a filter 50 is disposed in the prestage of the superconducting tunnel junction device 16. The filter 50 is in an approximate disc-shaped body and blocks infrared ray. For this reason, the filter 50 blocks infrared ray and infrared ray is not made incident to the superconducting tunnel junction device 16. Therefore, temperature rise of the superconducting tunnel junction device 16 is prevented, good operation environment is maintained, and more accurate detection result can be obtained.

Further, when light is made incident to the superconducting tunnel junction device 16, the electric current in proportion to the energy of the incident light is generated. Two circuit systems corresponding to signal levels are provided as the circuit system that takes out signals based on the electric current generated in this manner. Specifically, a circuit primarily for high energy such as x-ray and a circuit primarily for low energy such as visible light are disposed.

In the above-described constitution, when the broadband telescope 10 according to the present invention is used in astronomic observation, light in a broad energy band is made incident obliquely to the surface part 30*a* of the reflecting mirror 30 of the oblique incidence optical system unit 12 and is made incident approximately perpendicularly to the surface part 40*b* of the reflecting mirror 40 of the normal incidence optical system unit 14.

Then, in the oblique incidence optical system unit 12, light having the same energy as that of hard x-ray or less out of light in a broad energy band, which has been made incident obliquely to the surface part 30*a* of the reflecting mirror 30, is reflected twice by the aspherical reflecting mirror 12*c* of the oblique incidence optical system unit 12.

In other words, when light in a broad energy band is made incident to the end part 30*b* of each of a plurality of the reflecting mirrors 30, which constitute the paraboloid 12*a* of the oblique incidence optical system unit 12, light having the same energy as that of hard x-ray or less out of light in a broad energy band, which has been made incident obliquely to the surface part 30*a* of the reflecting mirror 30, is reflected at the surface part 30*a* of the reflecting mirror 30. Then, the light reflected at the surface part 30*a* of the reflecting mirror 30 is made incident to the surface part 32*a* of each of a plurality of the reflecting mirrors 32 that constitute the hyperboloid 12*b* of the oblique incidence optical system unit 12, and reflected at the surface part 32*a* of the reflecting mirror 32.

The light reflected at the surface part 32*a* of the reflecting mirror 32, that is, light in the region extending from visible light to hard x-ray out of light in a broad energy band that has been made incident to the surface part 30*a* of the reflecting mirror 30 is made incident to the filter 34. Then, the filter 34 blocks light having the same energy as that of extreme ultraviolet ray or less, light in the region extending from soft x-ray to hard x-ray transmits the filter 34, and condensed into the superconducting tunnel junction device 16 (refer to FIG. 10).

On the other hand, in the oblique incidence optical system unit 14, each light having a predetermined energy out of light in a broad energy band, which has been made incident to the surface part 40*b* of the reflecting mirror 40 as the primary mirror, transmits the multilayer film 40*e* on the surface part 40*b* of the reflecting mirror 40 in the depth direction according to an energy size, and is reflected at the boundary surface between the first layer 40*e*-1 and the second layer 40*e*-2, which has a corresponding periodic length d.

Then, interference of the reflected light reflected at the boundary surface between the first layer 40*e*-1 and the second layer 40*e*-2 is generated, and as a result, each light in the region extending from vacuum ultraviolet ray to extreme ultraviolet ray out of the incident light in a broad energy band is reflected at high reflectance.

On the other hand, light in the region of visible light having a lower energy than that of the region extending from vacuum ultraviolet ray to extreme ultraviolet ray is severally reflected at the surface 40*ee* of the multilayer film 40*e* on the surface part 40*b* of the reflecting mirror 40 at high reflectance by total reflection (specular reflection).

Figure 10:
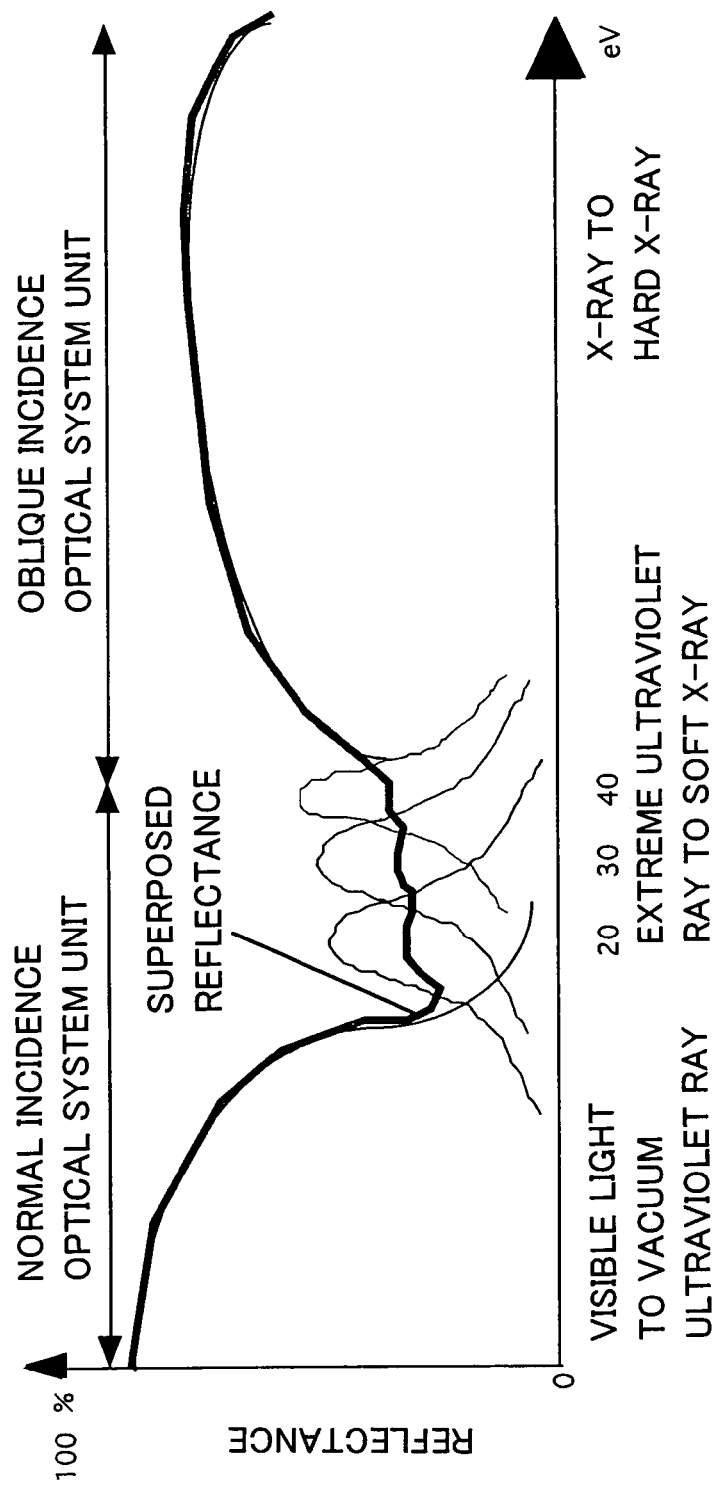
FIG. 10 is a graph illustrating synthesized reflectance characteristics of the oblique incidence optical system unit and the normal incidence optical system unit in one example of the embodiment of the broadband telescope according to the present invention.

As a result, the reflectance of the surface part 40*b* of the reflecting mirror 40 is reflectance where the reflectance of each boundary surface between the first layer 40*e*-1 and the second layer 40*e*-2, which has a predetermined periodic length d, of the multilayer film 40*e* and the reflectance of the surface part 40*ee* of the multilayer film 40*e* are superposed (refer to FIG. 10). Accordingly, the surface part 40*b* of the reflecting mirror 40 reflects each light in the region extending from visible light to extreme ultraviolet ray out of the incident light in a broad energy band at high reflectance.

The light reflected by the supermirror that constitutes the surface part 40*b* of the reflecting mirror 40 is reflected by the supermirror that constitutes the surface part 42*a* of the reflecting mirror 42 as the secondary mirror.

Herein, the supermirror that constitutes the surface part 42*a* of the reflecting mirror 42 is designed corresponding to the supermirror that constitutes the surface part 40*b* of the reflecting mirror 40 in order to reflect the light reflected at the surface part 40*b* of the reflecting mirror 40 at high reflectance. Therefore, each light in the region extending from visible light to extreme ultraviolet ray, which has been reflected by the surface part 40*b* of the reflecting mirror 40 at high reflectance, out of the light in a broad energy band, which has been made incident to the surface part 40*b* of the reflecting mirror 40 at high reflectance, is reflected at the surface part 42*a* of the reflecting mirror 42 at high reflectance.

Subsequently, the light reflected at the surface part 42*a* of the reflecting mirror 42, that is, each light in the region extending from visible light to extreme ultraviolet ray out of the light in a broad energy band, which has been made incident to the surface part 40*b* of the reflecting mirror 40, goes through the hole part 40*d* of the reflecting mirror 40, transmits the filter 44, and is condensed into the superconducting tunnel junction device 16.

When the light in the region extending form soft x-ray to hard x-ray, which is the reflected light from the oblique incidence optical system unit 12, and the light in the region extending form visible light to extreme ultraviolet ray, which is the reflected light from the normal incidence optical system unit 14, out of the light in a broad energy band that has been made incident to the broadband telescope 10 are condensed and made incident into the superconducting tunnel junction device 16, the electric current in proportion to the energy of light that has been made incident as described above is generated.

At this point, when the electric current is generated based on the light in the region extending form soft x-ray to hard x-ray, which is the reflected light from the oblique incidence optical system unit 12, the signal is taken out in the circuit for high energy, and when the electric current is generated based on the light in the region extending form visible light to extreme ultraviolet ray, which is the reflected light from the normal incidence optical system unit 14, the signal is taken out in the circuit for low energy, and light in the region extending from visible light to hard x-ray is spectrally detected.

As described above, since the broadband telescope 10 according to the present invention comprises: the oblique incidence optical system unit 12 having the aspherical reflecting mirror 12c; the oblique incidence optical system unit 14 having the reflecting mirror 40 on which the supermirror corresponding to light in the region extending from visible light to extreme ultraviolet ray is formed; and the superconducting tunnel junction device 16 having high sensitivity and spectroscopic capability in a broadband extending from infrared ray to x-ray, the advantages of the normal incidence optical system and the oblique incidence optical system are utilized well. Thus, a single telescope that is the confocal composite telescope of the normal incidence optical system and the oblique incidence optical system reflects light in a broad energy band of the range extending from visible light to hard x-ray at high reflectance, and the superconducting tunnel junction device 16 spectrally detects the light.

For this reason, the light in a broad energy band, particularly the light in the range extending from visible light to x-ray can be observed by the broadband telescope 10 according to the present invention.

Furthermore, in the broadband telescope 10 according to the present invention, the single telescope that is the confocal composite telescope of the normal incidence optical system and the oblique incidence optical system reflects light in a broad energy band of the range extending from visible light to hard x-ray at high reflectance, which eliminates the need of using a plurality of telescopes. Thus, cost reduction and space saving can be achieved and the light in a broad energy band can be efficiently observed simultaneously.

Furthermore, in the broadband telescope 10 according to the present invention, the single telescope reflects light in a broad energy band of the range extending from visible light to hard x-ray at high reflectance, so that only one superconducting tunnel junction device 16 may be disposed to which the reflected light from the oblique incidence optical system unit 12 and the reflected light from the normal incidence optical system unit 14 are condensed, by which cost can be reduced and a single cooler for cooling the superconducting tunnel junction device 16 is sufficient. Thus, further space saving can be realized in an astronomical satellite in which the broadband telescope 10 is mounted in performing astronomic observation.

It is to be noted that the superconducting tunnel junction device 16 is disposed at the rear surface side of the opening (that is, the end part 30b side of the reflecting mirror 30) of the aspherical reflecting mirror 12c of the oblique incidence optical system unit 12 and the rear surface side of the reflecting mirror 40 as the primary mirror of the normal incidence optical system unit 14, which facilitates the mounting of a cooling system such as the cooler for cooling the superconducting tunnel junction device 16.

Further, the broadband telescope 10 according to the present invention can be constituted so as to dispose the normal incidence optical system unit in an approximate columnar-shaped dead space formed in an inner diameter side of the aspherical reflecting mirror in the oblique incidence telescope so-called Wolter type I. For this reason, size reduction of the entire broadband telescope is easy, and the design know-how, etc. of the oblique incidence telescope can be utilized in such occasion.

Then, in the oblique incidence optical system unit 14, aberration correction can be performed by two mirrors, which are the reflecting mirror 40 as the primary mirror and the reflecting mirror 42 as the secondary mirror. Further, since the superconducting tunnel junction device 16 is the detector that can perform one photon spectral detection from infrared ray to x-ray, it can separately identify the photon even if the observation scope of the oblique incidence optical system unit 12 and the normal incidence optical system unit 14 is different from each other.

It is to be noted that the above-described embodiments can be modified into (1) to (7) described below.

(1) In the above-described embodiments, the filter 34 of the oblique incidence optical system unit 12 blocks light having the same energy as that of extreme ultraviolet ray or less, and the periodic length d of the multilayer film 40e on the surface part 40b of the reflecting mirror 40 corresponds to each light having a predetermined energy in the region extending from vacuum ultraviolet ray to extreme ultraviolet ray, but it goes without saying that the invention is not limited to this.

For example, the filter 34 may be modified to block light having the same energy as that of soft x-ray or less, and the periodic length d of the multilayer film 40e on the surface part 40b of the reflecting mirror 40 may be modified to correspond to each light having a predetermined energy in the region extending from vacuum ultraviolet ray to soft x-ray. As a result, since light having the same energy as that of hard x-ray or less, the synchronized reflectance of the oblique incidence optical system unit 12 and the normal incidence optical system unit 14 is as shown in FIG. 11 unlike FIG. 10.

Figure 11:
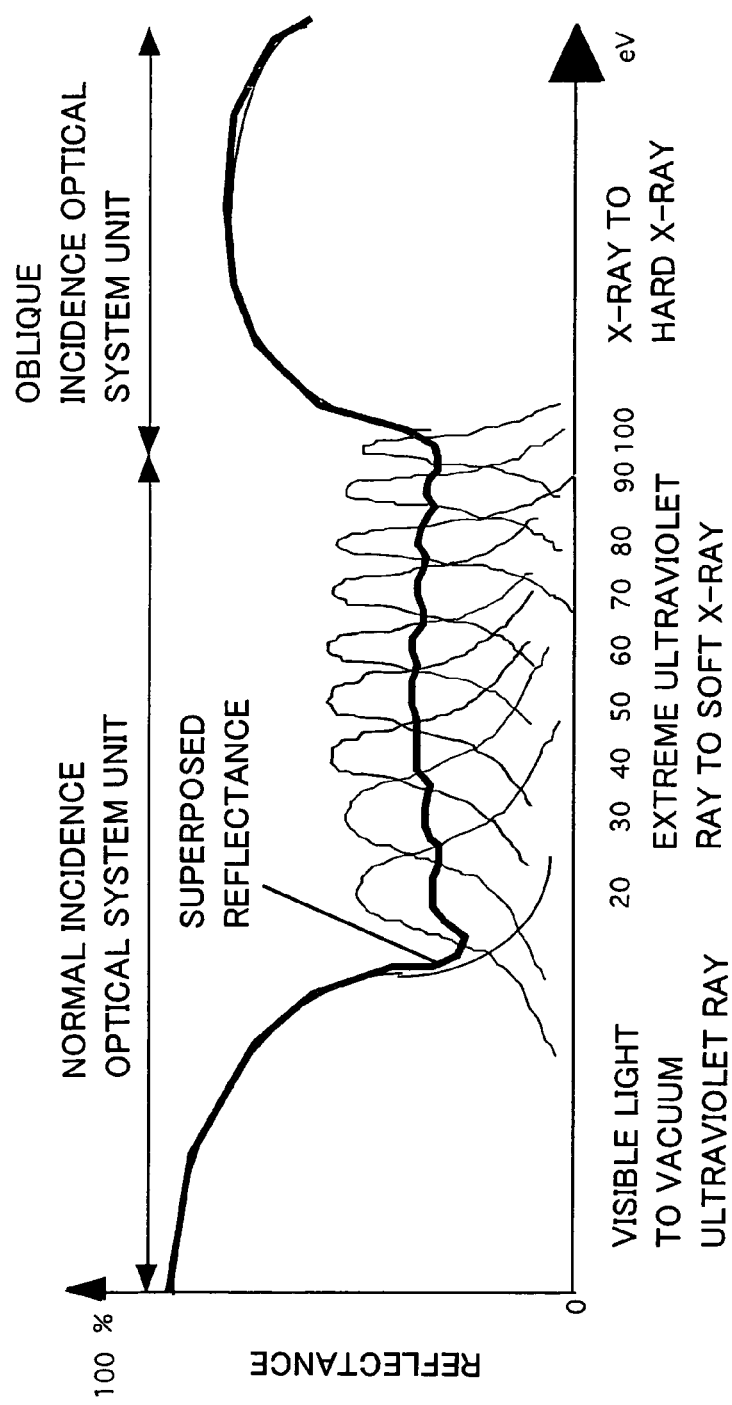
FIG. 11 is a graph illustrating synthesized reflectance characteristics of the oblique incidence optical system unit and the normal incidence optical system unit in another example of the embodiment of the broadband telescope according to the present invention.

As described, when the filter 34 is modified so as to selectively transmit only light having higher energy than that of the reflected light from the normal incidence optical system unit 14, the range of energy distributed to the oblique incidence optical system unit and the normal incidence optical system unit respectively can be changed by the filter (refer to FIG. 10 and FIG. 11).

Furthermore, although the filter 44 adjusts the quantity of light in the above-described embodiments, it goes without saying that the invention is not limited to this. The filter 44 may be used for adjusting the quantity of light or band selection to the reflected light from the normal incidence optical system unit 14. Alternatively, the filter 44 may not be disposed to simplify the constitution of the normal incidence optical system unit 14.

(2) In the above-described embodiments, deposition of Au (gold) or Pt (platinum) is performed on the surface part 30a of the reflecting mirror 30 and the surface part 32a of the reflecting mirror 32 of the oblique incidence optical system unit 12, but it goes without saying that the invention is not limited to this. A multilayer film or a supermirror may be formed on the surface part 30a of the reflecting mirror 30 and the surface part 32a of the reflecting mirror 32. This makes it possible to maintain high reflectance up to hard x-ray.

(3) In the above-described embodiments, top coating of Pt or the like may be applied to the uppermost layer of the reflecting mirror 40 and the reflecting mirror 42, which are constituted by the supermirror of the normal incidence optical system 12, which is the surface 40ee as the uppermost layer of the multilayer film 40e on the surface part 40b as shown in FIG. 5(b) in the case of the reflecting mirror 40, for example. This can further improve the reflectance with respect to light in the region of visible light having lower energy than that of the region extending from vacuum ultraviolet ray to extreme ultraviolet ray.

Further, the change of the periodic lengths d of the supermirror is not limited to the above-described embodiments. In the case where a particular wavelength does not make sense in observation, the particular wavelength may be eliminated and the periodic lengths d may be changed to correspond to necessary wavelengths.

Moreover, in the above-described embodiments, the same supermirror is formed on the entire region of the surface part 40b of the reflecting mirror 40 of the normal incidence optical system 12, that is, so as to form one type of supermirror on the reflecting mirror 40, but it goes without saying the invention is not limited to this. The surface part 40b of the reflecting mirror 40 may be divided into a plurality of regions and supermirrors of different types may be formed in each of the divided sections. At this point, the supermirror of the reflecting mirror 42 should be changed according to the type of the supermirror of the reflecting mirror 40.

(4) Regarding the size, the curvature, or the like of the reflecting mirror 30 and the reflecting mirror 32 of the oblique incidence optical system unit 12 and the reflecting mirror 40 and the reflecting mirror 42 of the normal incidence optical system unit 14, or the size and the constitution of the main unit 20 in the above-described embodiments, their dimensions may be set according to the observation objects of the reflecting mirrors (30, 32, 40, 42) and the space inside an observation satellite in which the telescope is mounted.

Figure 12:
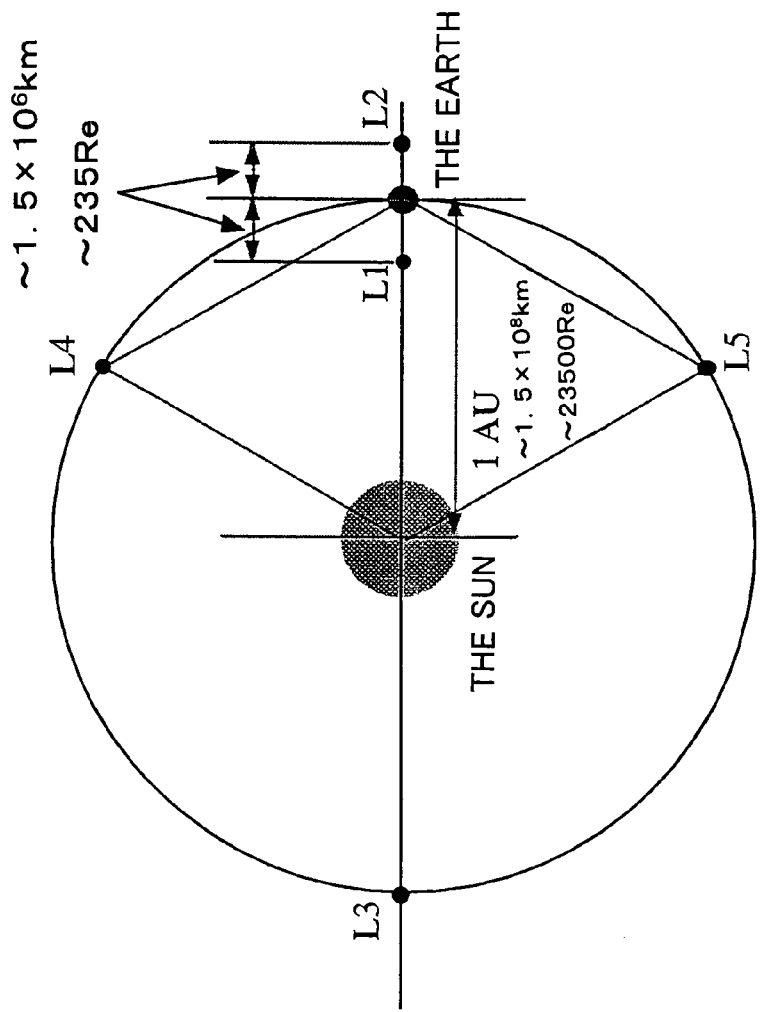
FIG. 12 is an explanatory view illustrating a first Lagrangian point (L1) as an example for positioning the broadband telescope according to the present invention.
Figure 13:
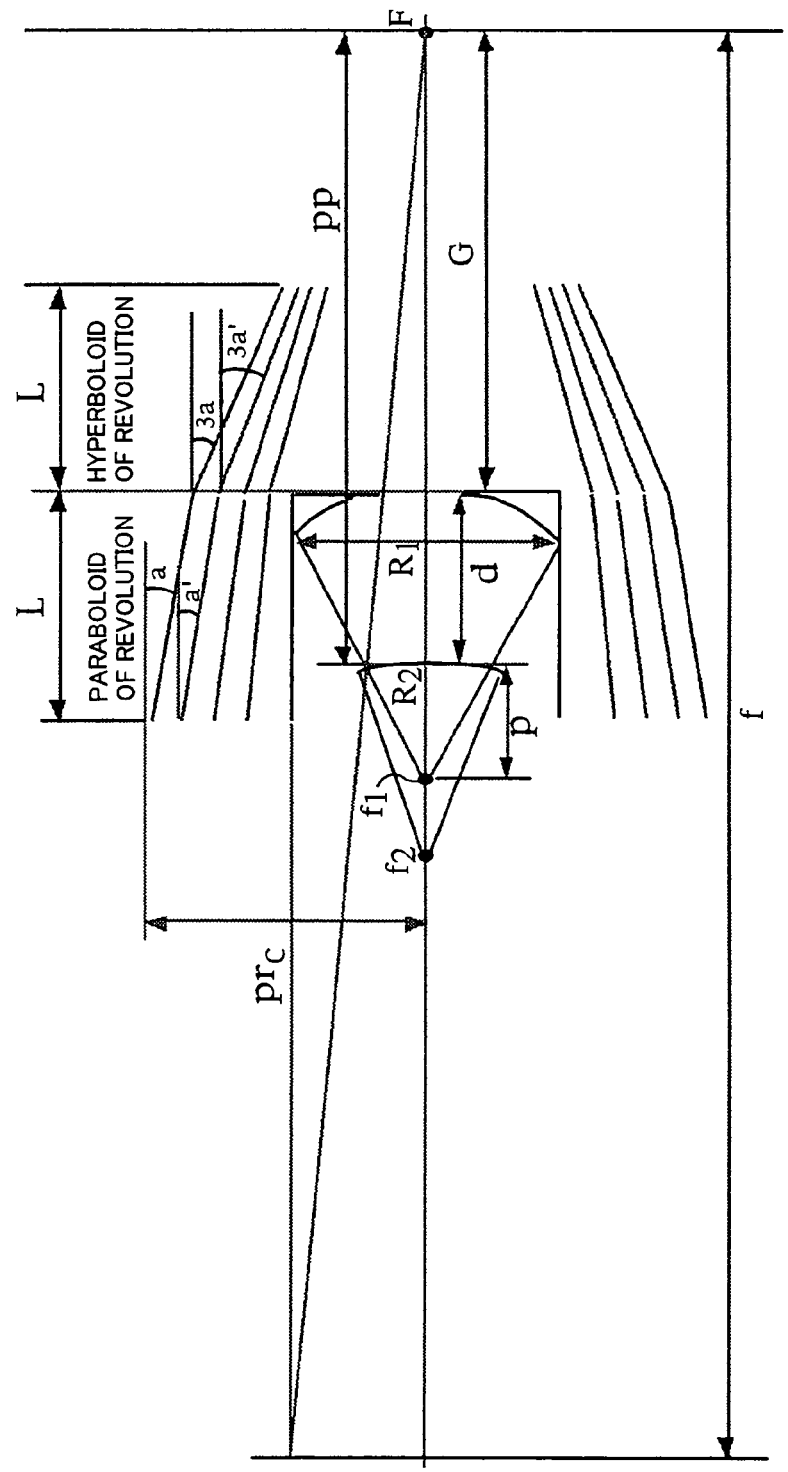
FIG. 13 is an explanatory view illustrating an example of specific dimensional settings of the broadband telescope according to the present invention.

It is to be noted that, when the broadband telescope according to is mounted in the observation satellite and the broadband telescope is located on Lagrangian point (refer to L1 shown in FIG. 12) to observe space plasma around the earth, around the earth, for example, as shown in FIG. 12 and FIG. 13, various changes of specific dimension setting should be performed.

In FIG. 13,

Oblique incidence telescope part (XRT part):

Mirror length of paraboloid of revolution (mirror length) L: 200 mm;

Focal length (distance) F: 600 mm;

Maximum incident angle a: 15 degrees;

Mirror thickness t: 1.5 mm;

Outer diameter $pr_o$:1020 mm;

Inner diameter: 200 mm;

Top coating: Pt (platinum) 50 nm,

Normal incidence telescope part:

Distance from focal point F (extended length) G: 50 mm;

Primary mirror focal length $f_1$:200 mm;

Secondary mirror focal length $f_2$: 31 166.7 mm;

Composite focal length f: 500 mm, and

Superconducting tunnel junction detector (STJ detector):

Detectable area size: 11×11 mm² are set.

Furthermore, the number of the reflection mirrors 30 and the reflection mirrors 32, which constitute the aspherical reflecting mirror 12c of the oblique incidence optical system unit 12, may be smaller than the total number of the reflecting mirrors constituting the paraboloid and the reflecting mirrors constituting the hyperboloid in the aspherical reflecting mirror of the oblique incidence telescope of so-called Wolter type I. In other words, the number of the reflection mirrors 30 and the reflection mirrors 32 is adjusted depending on the size and the position of the normal incidence optical system unit 14, which is located in the inner diameter side of the aspherical reflecting mirror 12c of the oblique incidence optical system unit 12, and the space inside the inner diameter of the oblique incidence optical system unit 12 should be changed.

Moreover, in the above-described embodiments, the approximate columnar-shaped aspherical reflecting mirror of so-called Wolter type I, which is used in the oblique incidence telescope, is disposed in the oblique incidence optical system unit 12, but it goes without saying that the invention is not limited to this. A different type of reflecting mirror from the aspherical reflecting mirror of Wolter type I may be disposed.

(5) In the above-described embodiment, when light extending form x-ray to visible region are detected simultaneously, there is a possibility of allowing a light event on a low energy side to be cancelled into a phonon event produced by light having high energy due to the characteristics of the superconducting tunnel junction device 16.

For this reason, when band pass filters for severally selecting x-ray, soft x-ray, extreme ultraviolet ray, ultraviolet ray and visible light ray are disposed, spectral detection of light in the region extending from x-ray to visible light can be performed more accurately.

Figure 14A:
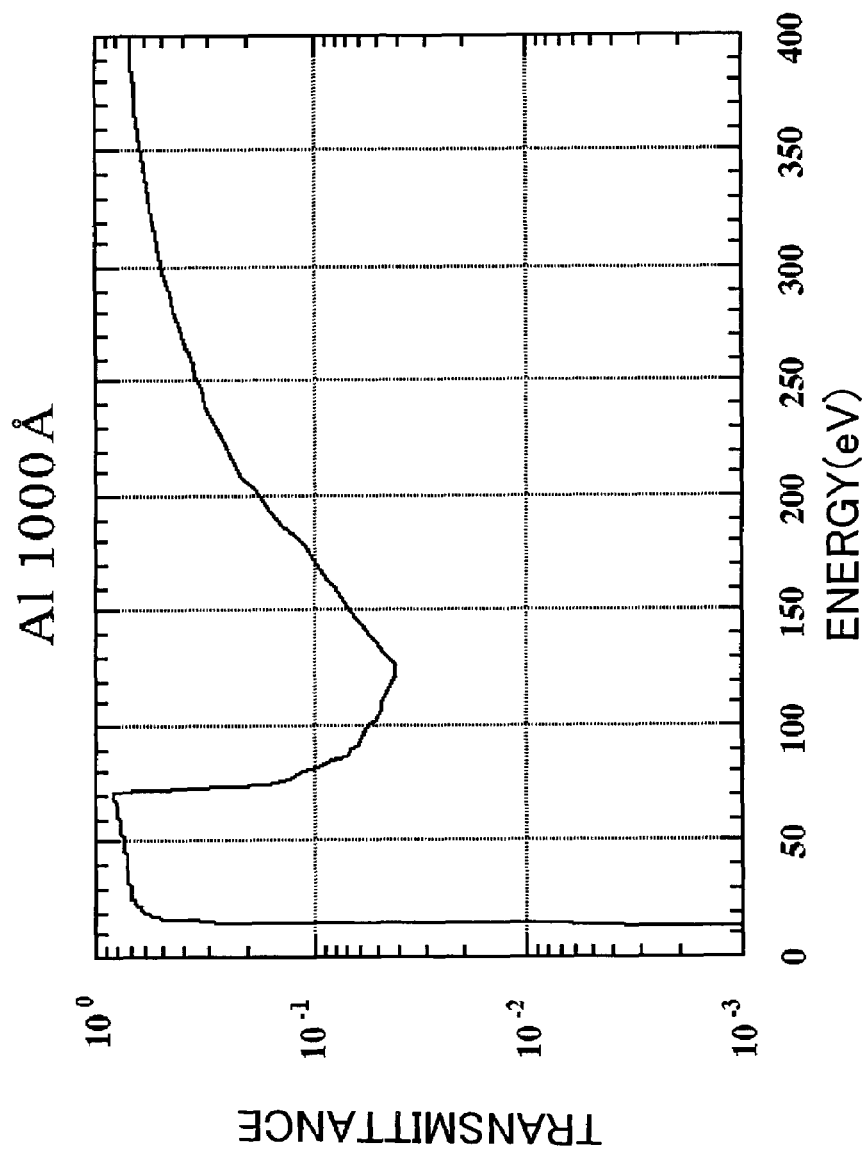
FIGS. 14($a$) and ($b$) are graphs illustrating the transmittance of an Al/C (aluminum/carbon) metal thin film filter.
Figure 14B:
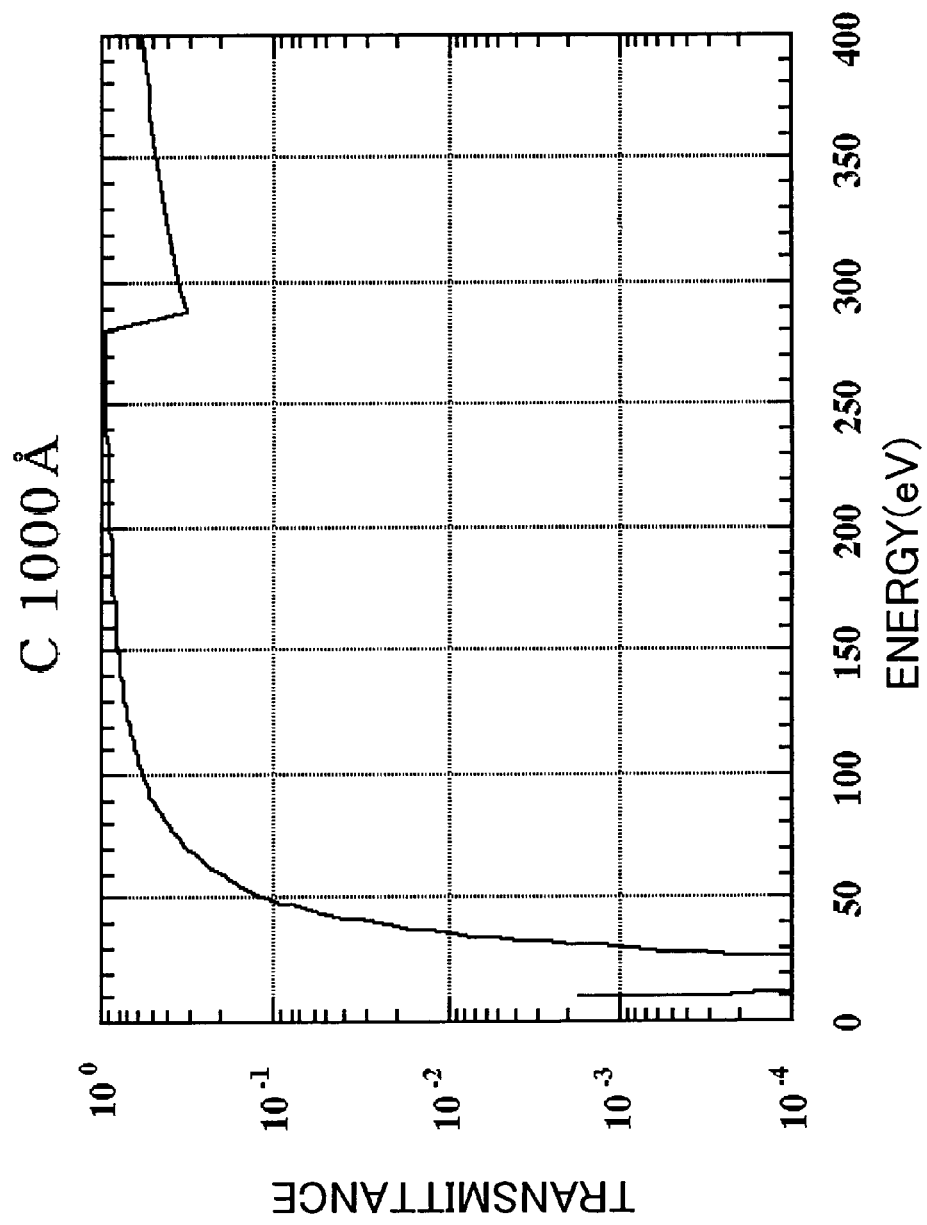

At this point, a thin film filter utilizing absorptive structure of material, which is an Al/C (aluminum/carbon) metal thin film filter, for example, can be used with respect to x-ray to vacuum ultraviolet ray (refer to FIGS. 14(a), (b)), and a filer utilizing the absorptive structure of material or a band pass filter utilizing interference can be used with respect to vacuum ultraviolet ray to visible light ray.

Further, respective events of x-ray, soft x-ray, extreme ultraviolet ray, ultraviolet ray and visible light ray may be separated from the phonon event by the rise-up time of electrical signals, which is detected as a result of incidence of reflected light to the superconducting tunnel junction device 16, without using such band pass filters.

This makes it possible to simultaneously detect light extending from x-ray to visible region further accurately.

Furthermore, as the filter disposed in the prestage of the superconducting tunnel junction device 16, a filter for adjusting the quantity of light that is made incident to the superconducting tunnel junction device 16 may be used.

(6) In the above-described embodiment, a plurality of the superconducting tunnel junction devices 16 may be used to implement spectroscopic imaging, and in such a case, changes or the like of various types of circuit systems may be made.

(7) The above-described embodiments and the modification examples shown in the above-described (1) to (6) may be combined appropriately.

INDUSTRIAL APPLICABILITY

Since the present invention is constituted as described above, it exerts superior effect that the advantages of the normal incidence optical system and the oblique incidence optical system are utilized well and light in a broad energy band, which is light in the region extending from visible light to x-ray, for example, can be observed.

Further, since the present invention is constituted as described above, it exerts superior effect that a composite telescope of the normal incidence optical system and the oblique incidence optical system reflects the light in a broad energy band that is the region extending from visible light to x-ray, for example, at high reflectance, by which cost reduction and space saving can be achieved and the light in a broad energy band can be observed efficiently.

What is claimed is:

1. A broadband telescope, comprising:

an oblique incidence optical system unit, which has a first reflecting mirror reflecting incident light at a first surface part made up of paraboloid of revolution, and a second reflecting mirror reflecting the light, which is reflected at said surface part of said first mirror, at a second surface part made up of hyperboloid of revolution;

a normal incidence optical system unit, which has a third reflecting mirror that has a third surface part on which a multilayer film is formed, which continuously changes periodic lengths along the depth direction to reflect each light of a predetermined energy in a region extending from vacuum ultraviolet ray to extreme ultraviolet ray and has high reflectance due to total reflection over a visible light region, and reflects the incident light at the third surface part, and a fourth reflecting mirror that has a fourth surface part on which a multilayer film is formed, which continuously changes the periodic lengths along the depth direction corresponding to said third surface part of said third reflecting mirror to reflect each light of a predetermined energy in the region extending from vacuum ultraviolet ray to extreme ultraviolet ray and has high reflectance due to total reflection over the visible light region, and reflects the light, which is reflected at said third surface part of said third reflecting mirror, at the fourth surface part; and a detector to which reflected light reflected at said second surface part of the second reflecting mirror and light reflected at said fourth reflecting mirror are made incident and which spectrally detects the incident light.

2. A broadband telescope as claimed in claim 1, wherein said first reflecting mirror and said second reflecting mirror of said oblique incidence optical system unit constitute an aspherical reflecting mirror of an approximate cylindrical shape, said normal incidence optical system unit is located within the inner diameter side of the aspherical reflecting mirrors, and said detector is located on an optical axis.

3. A broadband telescope as claimed in any one of claims 1 and 2, wherein said detector is a superconducting tunnel junction device.

4. A broadband telescope as claimed in claim 3, said telescope further comprising:

a filter that makes only light, which has higher energy than the reflected light reflected at the surface part of said normal incidence optical system unit out of the reflected light reflected at the surface part of the oblique incidence optical system unit, incident selectively to the detector.

5. A broadband telescope as claimed in any one of claims 1 and 2, said telescope further comprising:

a filter that makes only light, which has higher energy than the reflected light reflected at the surface part of said normal incidence optical system unit out of the reflected light reflected at the surface part of the oblique incidence optical system unit, incident selectively to the detector.

\* \* \* \* \*